(12) United States Patent  
Hallak

(10) Patent No.: US 8,027,179 B2  
(45) Date of Patent: Sep. 27, 2011

(54) INVERTER CIRCUIT AND METHOD FOR OPERATING THE INVERTER CIRCUIT

(75) Inventor: Jalal Hallak, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 485 days.

(21) Appl. No.: 12/227,927

(22) PCT Filed: Apr. 17, 2007

(86) PCT No.: PCT/EP2007/053740  
§ 371 (c)(1),  
(2), (4) Date: Dec. 2, 2008

(87) PCT Pub. No.: WO2007/141078  
PCT Pub. Date: Dec. 13, 2007

(65) Prior Publication Data  
US 2009/0251938 A1    Oct. 8, 2009

(30) Foreign Application Priority Data  
Jun. 2, 2006 (DE) .......................... 10 2006 025 975

(51) Int. Cl.  
    *H02M 3/24* (2006.01)
(52) U.S. Cl. ......................................... 363/98; 363/127
(58) Field of Classification Search ............. 363/16–17, 363/20, 21.06, 21.09, 37, 97, 98, 127, 131, 363/132; 320/108, 109, 128, 158; 323/301, 323/282, 285, 288, 266, 268, 903; 322/37, 322/45, 46; 310/93, 94  
See application file for complete search history.

(56) References Cited

U.S. PATENT DOCUMENTS

| 4,339,791 | A |   | 7/1982 | Mitchell |
| 4,628,426 | A | * | 12/1986 | Steigerwald .................. 363/17 |
| 5,027,264 | A | * | 6/1991 | DeDoncker et al. ........... 363/16 |
| 5,245,520 | A | * | 9/1993 | Imbertson ...................... 363/17 |
| 5,500,791 | A | * | 3/1996 | Kheraluwala et al. .......... 363/17 |
| 7,327,827 | B2 | * | 2/2008 | Sakamoto et al. ............. 378/103 |
| 7,821,801 | B2 | * | 10/2010 | Janson et al. .................. 363/126 |
| 2006/0062034 | A1 |  | 3/2006 | Acharya |

OTHER PUBLICATIONS

Enrico Dallago, "Advances in High-Frequency Power Conversion by Delta-Sigma Modulation", IEEE Transactions on Circuits and Systems 1: Fundamental Theory and Applications, vol. 44, NO. Aug. 8, 1997, pp. 712-721.

(Continued)

*Primary Examiner* — Rajnikant Patel

(57) ABSTRACT

An inverter circuit having a primary circuit with a first choke for periodically connecting a primary winding to a DC voltage present at an input of the inverter circuit, a secondary circuit with a secondary winding, the secondary winding arranged in series with a first capacitor and connected via a full bridge consisting of four switching elements to a AC voltage present at an output of the inverter circuit via a second choke, and a transformer, wherein the primary circuit and the secondary circuit are electrically isolated by the transformer.

20 Claims, 20 Drawing Sheets

OTHER PUBLICATIONS

Sanjaya Maniktala, "Slave converters power auziliary outputs", EDN, Oct. 17, 2002, pp. 79-92.

C.M. Penalver et al., "Microprocessor Control of DC/AC Static Converters", IEEE Transactions on Industrial Electronics, vol. IE-32, No. 3, Aug. 1985, pp. 186-191, Abstract.

D.Georgakis, S.Papathanassiou, N. Hatziargyriou, A. Engler, CH. Hardt, "Operation of a prototype Microgrid system based on microsources equipped with fast-acting power electronics interfaces", IEEE Power Electronics Specialists Conference, Aachen, Germany, Jun. 20, 2004, pp. 2521-2526.

Slobodan Cuk ,"Integrated Magnetics Versus Conventional Power Filtering", Invited Paper, Jun. 14, 1987 IEEE; Power Electronics Group California Institute of Technology, pp. 61-72.

Heinz Van Der Broeck, "Interactive Inverter for Photovoltaic Applications", Institute for Automation Technology, Cologne University, Cologne, Feb. 28, 2006, pp. 1-45.

* cited by examiner

INVERTER CIRCUIT AND METHOD FOR OPERATING THE INVERTER CIRCUIT

CROSS REFERENCE TO RELATED APPLICATIONS

This application is the US National Stage of International Application No. PCT/EP2007/053740 filed Apr. 17, 2007 and claims the benefit thereof. The International Application claims the benefits of German application No. 10 2006 025 975.0 DE filed Jun. 2, 2006. Both of the applications are incorporated by reference herein in their entirety.

FIELD OF INVENTION

The invention relates to an inverter circuit comprising a primary circuit and a secondary circuit which are electrically isolated by means of a transformer, wherein the primary circuit comprises means of periodically connecting a primary winding to a DC voltage present at an input of the inverter circuit and wherein the secondary circuit comprises means of connecting a secondary winding to an AC voltage present at an output of the inverter circuit. The invention also relates to methods for operating the inverter circuit.

BACKGROUND OF INVENTION

A large number of inverter circuits with different possible applications are known from the prior art. These use various basic types of electronic converters such as boost converters, buck converters or buck-boost converters and combinations thereof. Examples may be found in a publication in the periodical EDN of 17 Oct. 2002 "Slave converters power auxiliary outputs", Sanjaya Maniktala, which describes various possible combinations of basic inverter types.

Different inverter circuits and their electronic control circuitry are also known e.g. from C. M. Penalver et al. "Microprocessor Control of DC/AC Static Converters"; IEEE Transactions on Industrial Electronics, Vol. IE-32, No. 3, August 1985, pp. 186-191.

Inverter circuits are used, for example, in photovoltaic systems to convert the direct current generated by photovoltaic cells so that it can be fed into public utility grids. Particularly in photovoltaic systems, high efficiency inverter circuits are required in order to enable this alternative source of power to be used cost-effectively. In addition, various conditions imposed by the power utilities and authorities must be met, e.g. the injection of a sinusoidal current or electrical isolation between photovoltaic cells and utility grid.

The publication: Heinz van der Broeck, "Interactive Inverter for Photovoltaic Applications", Institute for Automation Technology, Cologne University, Cologne (2006) gives details of various inverter circuits for use in photovoltaic systems. The disadvantage with these topologies, however, is the number of components required, particularly of electronic switches, because this means increased switching losses and component costs.

SUMMARY OF INVENTION

An object of the invention is to specify an improvement compared to the prior art for an inverter circuit of the type mentioned in the introduction.

This object is achieved by an inverter circuit comprising a primary circuit and a secondary circuit which are electrically isolated by means of a transformer, wherein the primary circuit comprises means of periodically connecting a primary winding to a DC voltage present at an input of the inverter circuit and wherein the secondary circuit comprises means of connecting a secondary winding to an AC voltage present at an output of the inverter circuit, and wherein the primary circuit is additionally connected to the DC voltage via a first choke and the secondary winding arranged in series with a first capacitor via a full bridge formed from four switching elements is connected to the AC voltage via a second choke.

The inverter circuit is suitable for the deployment of small-sized RF transformers, thereby enabling a smaller and less expensive electrically isolated inverter to be implemented. By flexibly designing the primary circuit and disposing only four switches on the secondary side, on the one hand the component costs are minimized and, on the other, the switching losses are limited. Altogether this results in a particularly low-loss, high-efficiency inverter circuit. Moreover, due to the two chokes, the input and output ripple is low and the entire inverter circuit is protected against voltage spikes on both sides.

Another advantage is the possibility of bidirectional energy transfer, thereby enabling e.g. buffer circuits to be implemented wherein the inverter arrangement is disposed between a battery and a power grid. In the event of excess energy in the power grid, the battery is charged from the grid by the inverter transferring energy from the actual secondary side to the actual primary side.

Bidirectional energy transfer also allows a photovoltaic system to be connected to an island AC power grid in which capacitive and inductive loads cause voltage and current to be out of phase. The reactive power can then be transferred from the grid to a storage capacitor on the primary side of the inverter circuit.

In an advantageous arrangement, the full bridge is disposed in a simple manner such that a first winding termination of the secondary winding is connected via a first switching element to a first terminal of the second choke and via a fourth switching element to a reference potential of the AC voltage and that a second winding terminal of the secondary winding in series with the first capacitor is connected via a second switching element to the first terminal of the second choke and via a third switching element to the reference potential of the AC voltage.

An advantageous embodiment of the invention provides that the primary circuit comprises a fifth switching element and a second capacitor which, in conjunction with the choke, form the primary stage of a Cuk converter. This means that only one switching element is required on the primary side, thereby enabling the periodically operated switches to be controlled in a simple manner. In addition, the transformer demagnetization is not dependent on the tolerance of the control signal times and, due to the capacitive coupling, the risk of DC saturation is eliminated. Moreover, the low component count compared to prior art inverter topologies allows the size of the inverter to be reduced.

In another advantageous embodiment of the invention, the primary circuit comprises a split primary winding and a fifth and a sixth switching element which, in conjunction with the first choke, form the primary stage of a push-pull converter. In this arrangement, no capacitor is required on the primary side, nor is any extra winding required in order to discharge the magnetic field of the transformer, as the transformer's magnetic field is used in both directions.

It is also advantageous if the primary winding, the secondary winding and the winding of the first choke are disposed on a transformer core, thereby achieving a more compact circuit design which, on the one hand, saves costs and, on the other, leads to a reduction in the installed size of the inverter unit.

In an advantageous embodiment of the invention, the switching elements are implemented as n-channel insulated-gate field effect transistors. The parasitic diodes of these electronic switching elements reduce the switching operations required, as said parasitic diodes act as rectifier elements on the secondary side independently of the switching state.

According to another advantageous embodiment, the switching elements are implemented as so-called insulated-gate bipolar transistors (IGBTs) with parallel-connected diodes. In the ON-state, these switching elements have a particularly low dropping voltage, thereby resulting in lower losses.

It is also advantageous if a control unit designed to control the switching elements is provided which is connected to the DC voltage and the AC voltage via measuring arrangements and linked to the switching elements. This enables simple closed-loop control of the inverter circuit to be realized.

Methods for operating the inverter circuit provide that during a positive AC voltage half-cycle the first switching element is opened and the second and fourth switching elements are closed and that the third switching element is switched inversely to the switching mode of the primary circuit and that, in addition, during a negative AC voltage half-cycle the fourth switching element is opened and the first and third switching elements are closed and that the second switching element is switched inversely to the switching mode of the primary circuit. This means that all the design advantages of the inverter circuit are utilized. In addition, the methods can be simply implemented in a control unit.

An advantageous method provides that, in the event of a positive AC voltage half-cycle and a negative output current, the third switching element is switched in a pulse width modulated manner such that each charging cycle of the transformer begins with the closing of the third switching element and that, in the event of a negative AC voltage half-cycle and a positive output current, the second switching element is switched such that each charging cycle of the transformer begins with the closing of the second switching element. This means that energy can be transferred from the grid to the actual primary side. In addition, this method allows primary-side reactive power absorption and therefore enables the inverter circuit to be used in an island AC voltage grid.

BRIEF DESCRIPTION OF THE DRAWINGS

The invention will now be explained using examples and with reference to the accompanying schematic drawings, in which.

DETAILED DESCRIPTION OF INVENTION

Figure 1:
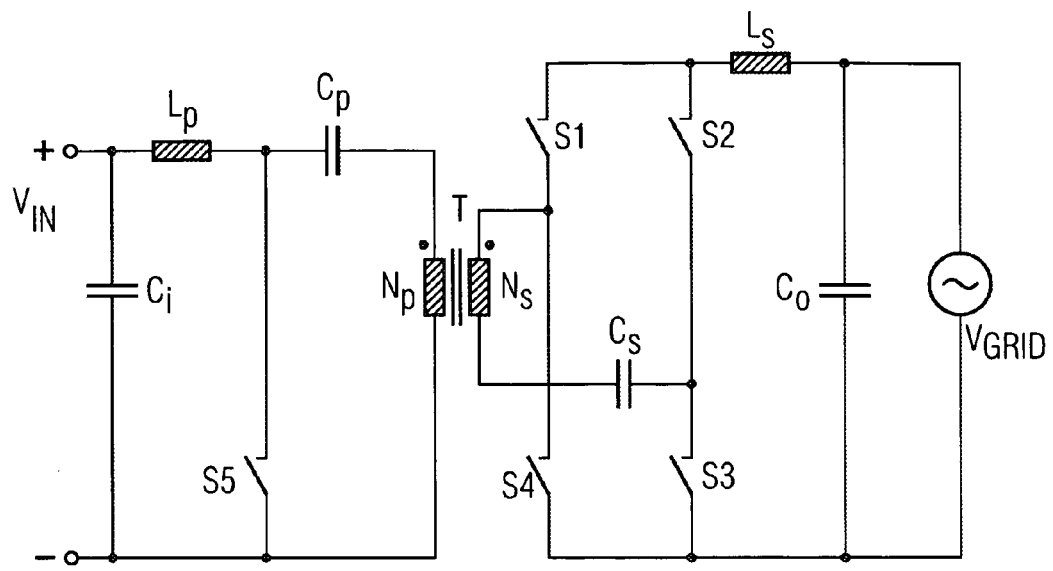
FIG. 1 shows an inverter circuit with Cuk primary stage and general switching elements

FIG. 1 shows a primary stage of a Cuk converter comprising a transformer T and a secondary stage implemented as a full bridge. The secondary stage comprises four switching elements S1, S2, S3 and S4 which are interconnected to form a full bridge. The full bridge connects a secondary winding $N_S$ disposed on the transformer T in series with a first capacitor $C_S$ via a second choke $L_S$ and an output capacitor $C_o$ to an AC voltage $V_{GRID}$.

The primary stage comprises a primary winding $N_P$ disposed on the transformer T, said winding being connected in series with a second capacitor $C_P$ and a first choke $L_P$ via an input capacitor $C_i$ to a DC voltage $V_{IN}$. Connected in parallel with the primary winding $N_P$ and second capacitor $C_P$ is a fifth switching element S5.

The primary and secondary winding $N_P$, $N_S$ are disposed on the transformer T with the same winding direction. A three-limb transformer core, for example, can also be used, wherein the primary and secondary windings $N_P$, $N_S$ are disposed on the outer limbs and the winding of the first choke $L_P$ on the inner limb.

Figure 2:
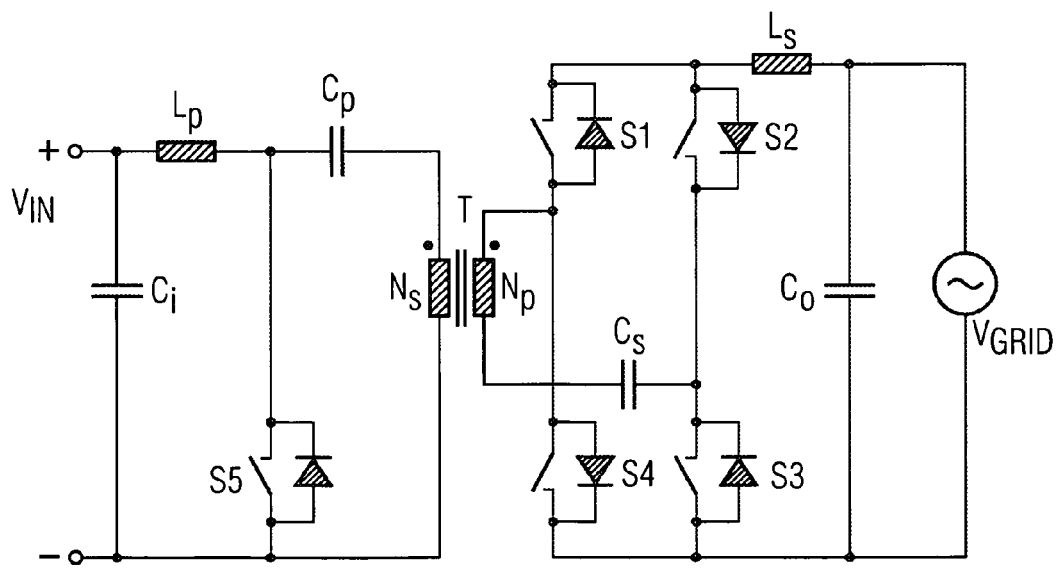
FIG. 2 shows an inverter circuit with Cuk primary stage and n-channel insulated-gate field effect transistors (depletion-mode MOSFETs)

The circuit arrangement shown in FIG. 2 corresponds to that in FIG. 1 except that the switching elements S1, S2, S3, S4 and S5 are implemented as n-channel depletion-mode MOSFETs. In the primary stage, the fifth switching element S5 implemented as a MOSFET is arranged with the parasitic diode in such a way that the source terminal is connected to the negative pole and the drain terminal is connected via the first choke $L_P$ to the positive pole of the DC voltage $V_{IN}$.

On the secondary side, the switching elements S1, S2, S3 and S4 implemented as MOSFETs in full-bridge configuration are disposed such that the start of the secondary winding $N_S$ is connected to the source terminals of the first and fourth switching elements S1 and S4 of the first half of the bridge and that the end of the secondary winding $N_S$ is connected via the first capacitor $C_S$ to the drain terminals of the second and third switching elements S2 and S3 of the second half of the bridge. In this configuration, the parasitic diodes of the MOSFETs only become conducting in the desired current direction, the current also flowing through particular turned-off MOSFETs in particular phases of a switching cycle, thereby reducing the switching signal changes required. These particular MOSFETs do not therefore need to be specially turned on in order to allow the desired current flow, as the current flows through the parasitic diodes. However, because of the low dropping voltages of the closed MOSFET switches compared to the parasitic diodes, it is advantageous always to switch the switching elements implemented as MOSFET switches according to the desired current flow.

Figure 3:
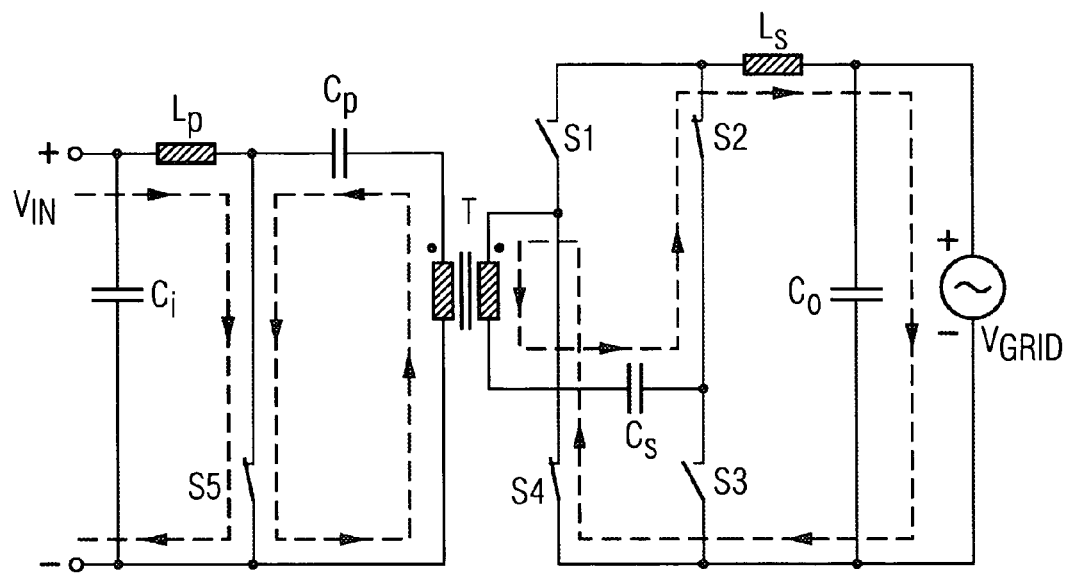
FIG. 3 shows an inverter circuit according to FIG. 1 with current flow during an ON-phase in the case of a positive half-cycle
Figure 4:
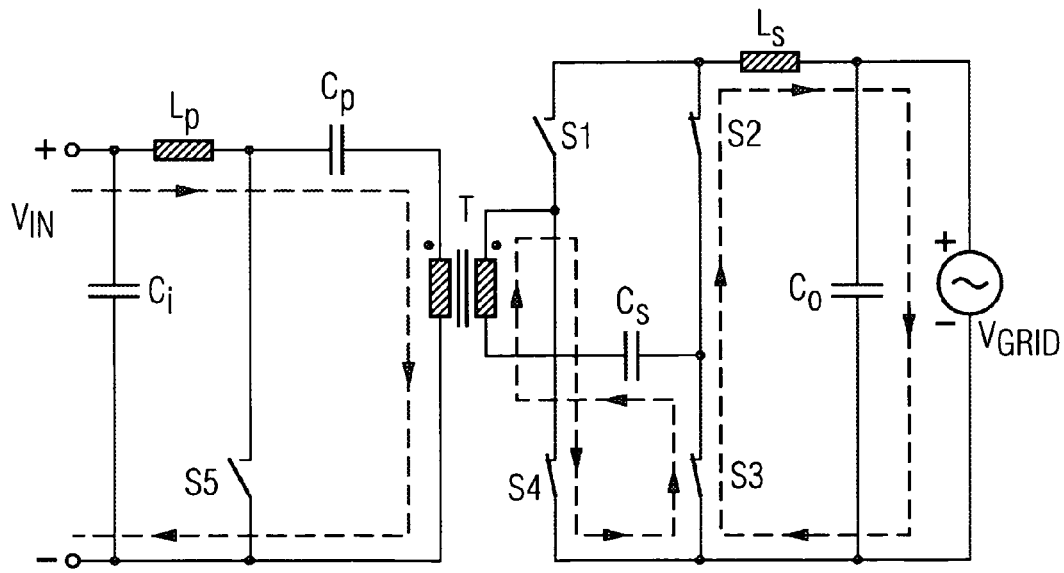
FIG. 4 shows an inverter circuit according to FIG. 1 with current flow during an OFF-phase in the case of a positive half-cycle

Alternatively, IGBTs with parallel-connected high-speed diodes can also be used. These fast acting diodes exhibit lower switching losses than the parasitic diodes of the MOSFETs and replace, for example, the switching cycles of a third switching element S3 implemented as an IGBT during injection into an AC voltage grid (FIGS. 3 and 4). A second switching element S2 implemented as an IGBT then also remains always open during injection into the AC voltage grid (FIGS. 3 and 4), with the current flowing in the parallel-connected high-speed diode.

The desired current flow and the corresponding switching states are shown in FIGS. 3 to 10 for the circuit illustrated in FIG. 1.

FIGS. 3 to 6 show the current flow during feeding into an AC voltage grid with grid-commutated operation, the inverter circuit supplying the current produced by a power source to the AC voltage grid in synchronism with the grid voltage $V_{GRID}$. FIG. 3 shows the first switching phase in the case of a positive grid half-cycle. The first switching element S1 of the full bridge is always open during a positive grid half-cycle. The second and fourth switching elements S2 and S4 are always closed during a positive grid half-cycle. The first cycle begins with the closing of the fifth switching element S5 in the primary stage and the opening of the third switching element S3 of the full bridge. These two switching elements S1 and S3 are subsequently switched in a pulse width modulated manner, the two switching elements S1 and S3 being switched inversely to one another.

When the fifth switching element S5 is closed, current flows from the positive pole of the DC voltage $V_{IN}$ through the first choke $L_P$ via the fifth switching element S5 to the negative pole of the DC voltage $V_{IN}$. In a second primary-side circuit, current flows in the same direction through the fifth switching element S5 and through the primary winding $N_P$ of the transformer T and the second capacitor $C_P$.

On the secondary side, current is induced in the secondary winding $N_S$ and flows via the first capacitor $C_S$, the second switching element S2 and the second choke $L_S$ into the connected AC voltage grid, the circuit being completed via the fourth switching element S4 of the full bridge.

FIG. 4 shows the next phase, at the start of which the fifth switching element S5 is opened and the third switching element S3 is closed, with current continuing to flow from the positive pole of the DC voltage $V_{IN}$ through the first choke $L_P$ and on (in the opposite direction to the ON-phase) via the second capacitor $C_P$ through the primary winding $N_P$ to the negative pole of the DC voltage $V_{IN}$.

On the secondary side, there is formed by the closed second and the closed third switching element S2, S3 a circuit in which the direction of current flow remains unchanged by the second choke $L_S$. A second secondary-side circuit is formed by the closed third switching element, the first capacitor $C_S$, the secondary winding $N_S$ and the closed fourth switching element S4, the current direction in the secondary winding $N_S$ being the reverse of that in the preceding phase. During this phase the transformer T is demagnetized for the next ON-phase.

Figure 5:
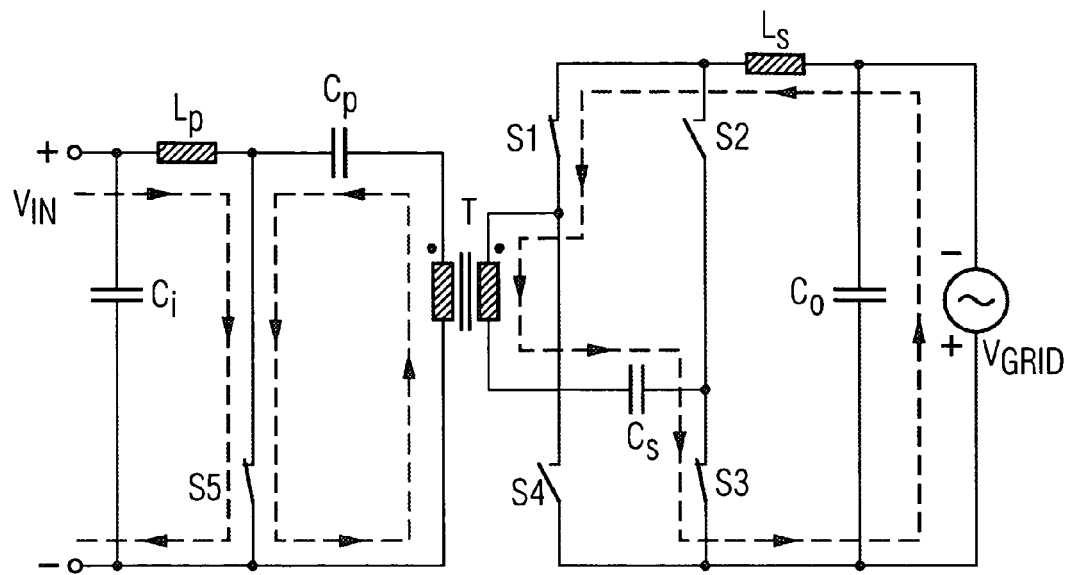
FIG. 5 shows an inverter circuit according to FIG. 1 with current flow during an ON-phase in the case of a negative half-cycle
Figure 6:
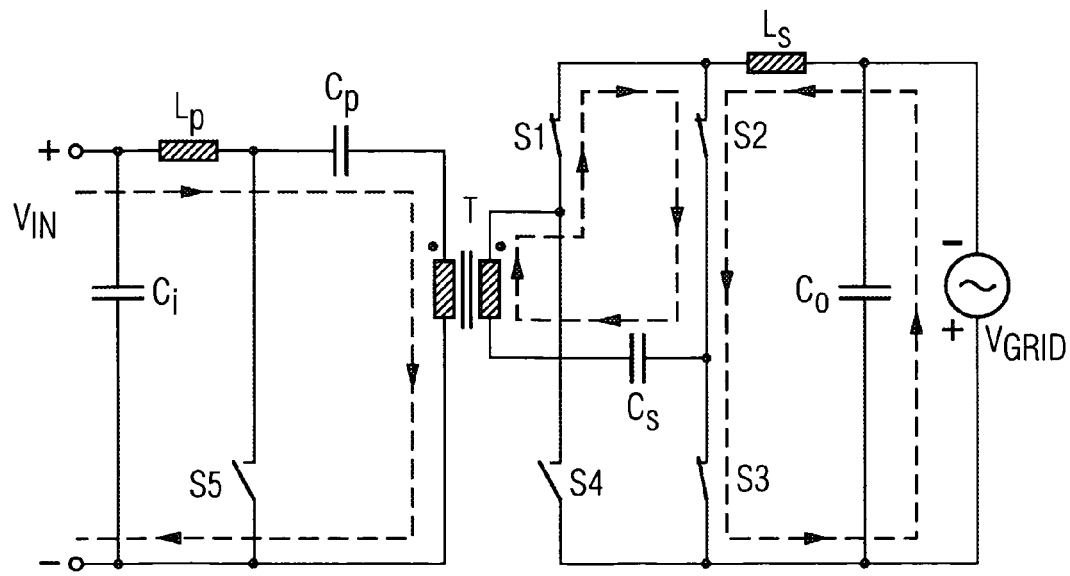
FIG. 6 shows an inverter circuit according to FIG. 1 with current flow during an OFF-phase in the case of a negative half-cycle

FIGS. 5 and 6 show the flow of current during an ON-phase and an OFF-phase in the case of a negative half-cycle of the grid voltage. Here the first and the third switching elements S1 and S3 are closed during the entire negative half-cycle. The fourth switching element is open during the entire negative half-cycle and the second switching element switches inversely to the fifth switching element S5 of the primary stage.

The first cycle begins with the closing of the fifth switching element S5 and the opening of the second switching element S2. The primary-side current flow corresponds to that shown in FIG. 3. On the secondary side, current is induced in the secondary winding $N_S$ and flows via the first capacitor $C_S$ and the third switching element S3 into the AC voltage grid, the circuit being completed via the second choke $L_S$ and the first switching element S1.

The subsequent OFF-phase, shown in FIG. 6, begins with the opening of the fifth switching element S5 and the closing of the second switching element S2, the primary-side current flow corresponding to that shown in FIG. 4. On the secondary side, the current flow in the secondary winding $N_S$ is again reversed, a first circuit running via the first switching element S1, the second switching element S2 and the first capacitor $C_S$. A second circuit runs in the same direction via the second switching element S2, the third switching element S3, the AC voltage grid and the second choke $L_S$. During this phase the transformer T is again demagnetized for the next switch-on operation.

By varying the ratio between ON- and OFF-phase by means of pulse width modulation, a sinusoidal current feed is achieved, with the first and second chokes $L_P$ and $L_S$ attenuating the input and output current ripple.

The circuit shown allows energy to flow from the actual secondary side to the actual primary side. A reverse energy flow of this kind may be required if, for example, a battery is disposed on the primary side. This battery is used e.g. as a backup for an alternative power source and generally supplies current to the grid, but can also be charged from the grid using an inverter circuit. In the same way it is possible to transfer the reactive power from the grid to the primary side. This enables the inverter circuit to be used to connect power sources incorporating buffer elements (e.g. battery, electrolytic capacitors) to an island power grid. In island power grids, inductive and capacitive loads result in reactive power that cannot be compensated. However, even in public utility grids, the load on the grid can be reduced by backfeeding of reactive power if the backfeeding takes place in the immediate vicinity of the reactive power producing load.

Figure 7:
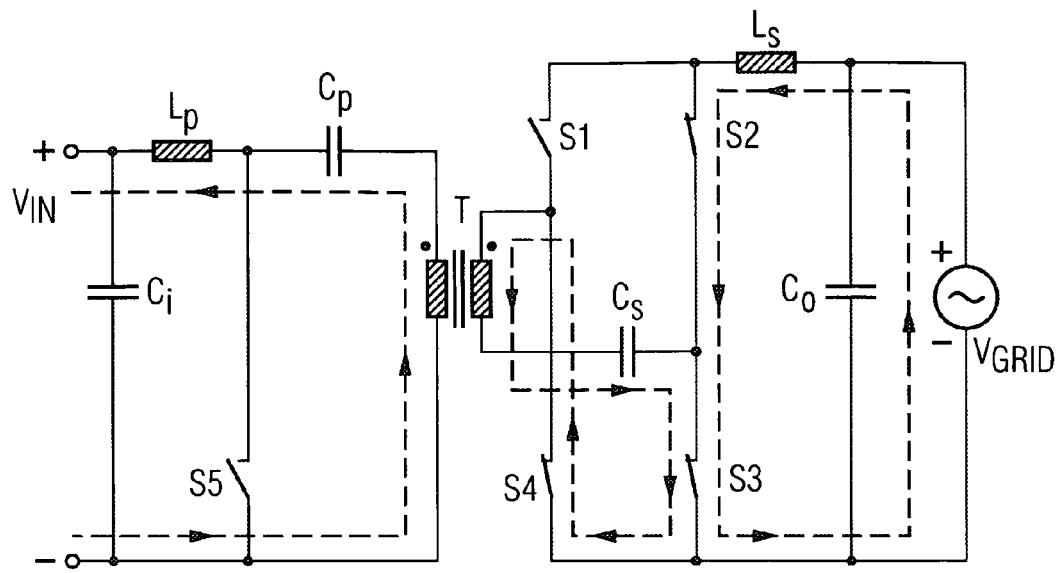
FIG. 7 shows an inverter circuit according to FIG. 1 with backfeeding current flow during an ON-phase in the case of a positive half-cycle
Figure 8:
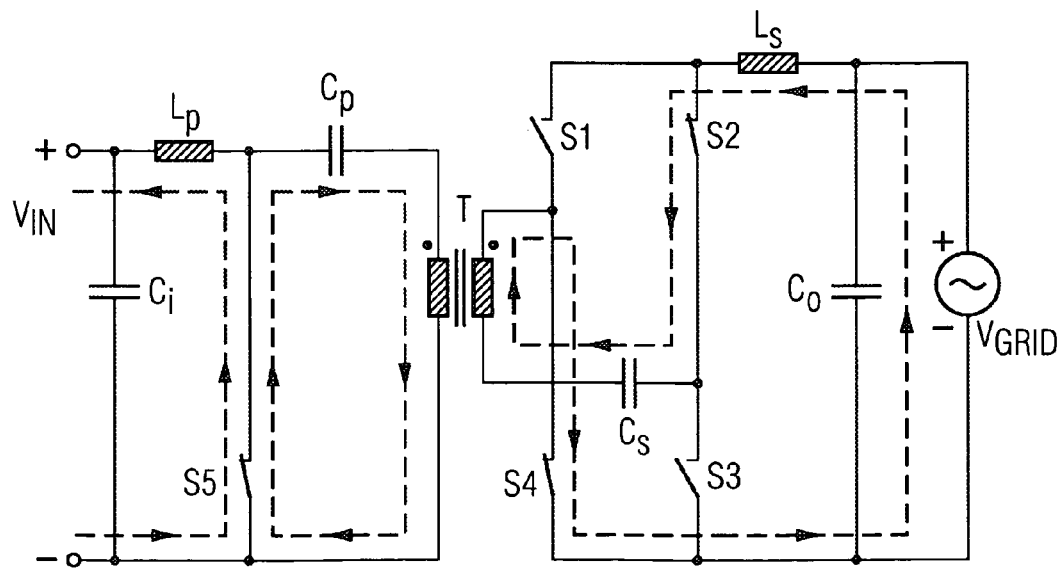
FIG. 8 shows an inverter circuit according to FIG. 1 with backfeeding current flow during an OFF-phase in the case of a positive half-cycle

FIGS. 7 to 10 show energy transfer from an AC voltage grid connected on the secondary side to the actual primary side. Here, as shown in FIGS. 7 and 8, during a positive half-cycle of the grid the second switching element S2 and the fourth switching element S4 are closed and the first switching element S1 is open. The third switching element S3 of the full bridge switches inversely to the fifth switching element S5 of the primary stage.

A cycle begins with the closing of the third switching element S3 and the opening of the fifth switching element S5. On the secondary side the second choke $L_S$ is charged, the circuit being completed via the second and third switching elements S2 and S3. A second secondary-side circuit runs in the same direction via the third switching element S3 and via the fourth switching element S4, the secondary winding Ns and the first capacitor $C_S$. On the primary side, current is induced in the primary winding $N_P$ and flows from the negative pole via the second capacitor $C_P$ and the first inductor $L_P$ to the positive pole of the DC voltage $V_{IN}$.

At the start of the OFF-phase shown in FIG. 8, the third switching element S3 is opened and the fifth switching element S5 is closed. The switching states of the other switching elements S1, S2 and S4 remain unchanged. Current continues to flow from the AC voltage grid through the second choke $L_S$ via the second switching element S2 and on via the first capacitor $C_S$, the secondary winding $N_S$ and the fourth switching element S4. On the primary side, the current direction in the primary winding, $N_P$ reverses and a first primary-side circuit runs via the fifth switching element S5 and the second capacitor $C_P$. In a second primary-side circuit, current flows from the negative pole via the fifth switching element through the first choke $L_P$ to the positive pole of the DC voltage $V_{IN}$.

Figure 9:
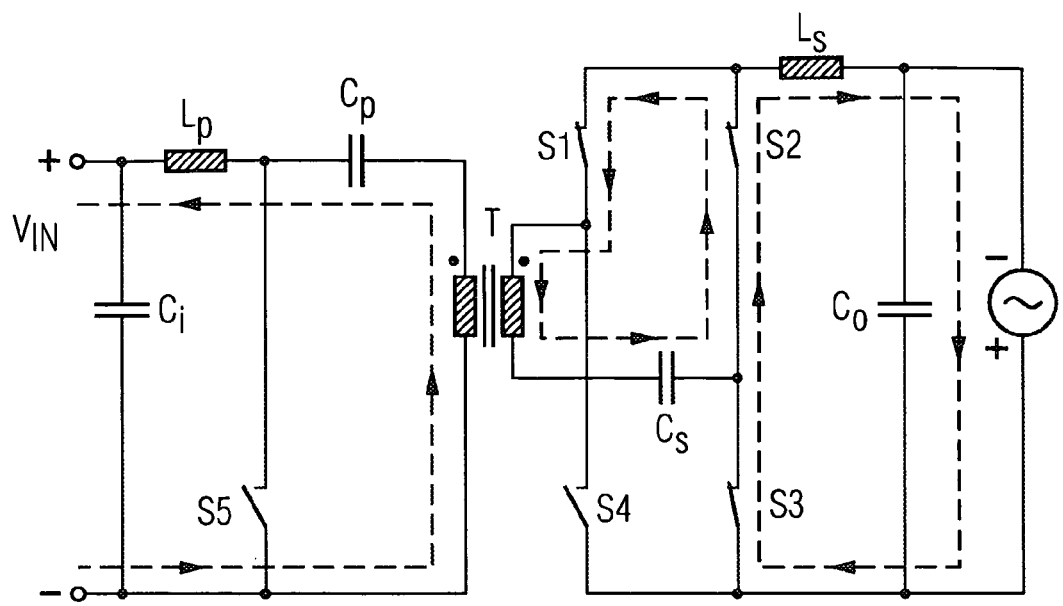
FIG. 9 shows an inverter circuit according to FIG. 1 with backfeeding current flow during an ON-phase in the case of a negative half-cycle
Figure 10:
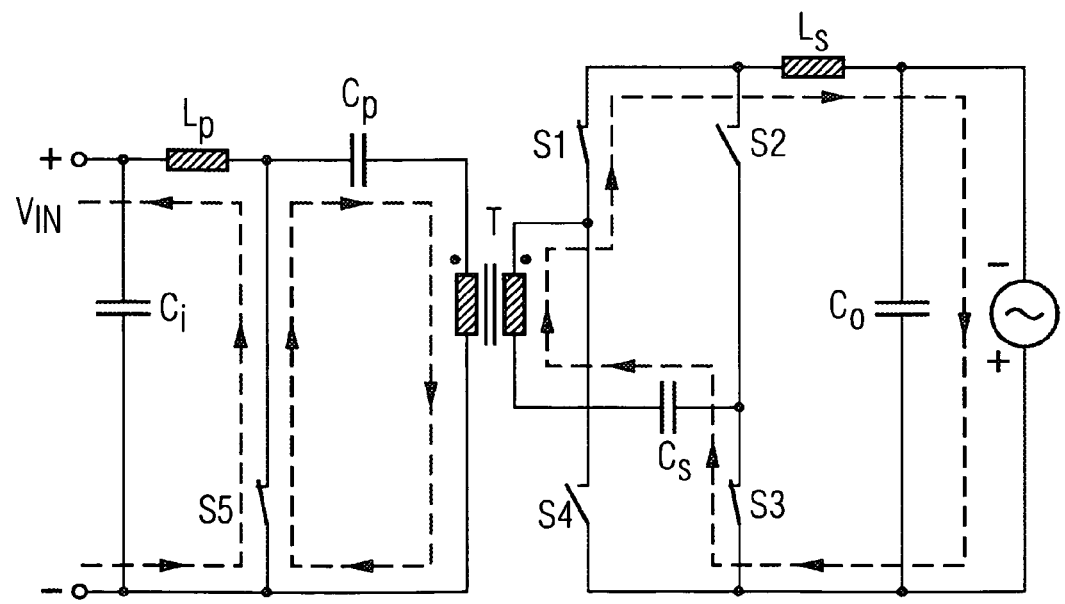
FIG. 10 shows an inverter circuit according to FIG. 1 with backfeeding current flow during an OFF-phase in the case of a negative half-cycle

FIGS. 9 and 10 show backfeeding during a negative half-cycle of the grid, the first and third switching elements S1 and S3 being closed and the fourth switching element S4 being open. The second switching element S2 switches inversely to the fifth switching element S5. The ON-phase shown in FIG. 9 begins with the closing of the second switching element S2 and the opening of the fifth switching element. Current flows from the power grid via the third switching element S3 and the second switching element S2 into the second choke $L_S$. In a second circuit, current flows in the same direction via the second switching element S2 and on via the first switching element S1 into the secondary winding Ns and on via the first capacitor Cs. On the actual primary side, the current flow corresponds to that shown in FIG. 7.

The OFF-phase shown in FIG. 10 begins with the opening of the second switching element S2 and the closing of the fifth switching element S5. Current from the grid flows on through the second choke $L_S$ via the third switching element. S3, the first capacitor $C_S$, the secondary winding Ns and the first switching element S1. The current flow from the actual primary side corresponds to that shown in FIG. 8. During this phase the transformer T is again demagnetized for the next ON-phase, the first and second capacitors $C_S$ and $C_P$ ensuring that the core of the transformer T is not saturated by DC components.

FIGS. 11 to 14 show the waveforms of a positive and a negative voltage half-cycle with switching states of the switching elements S1, S2, S3, S4 and S5 corresponding to different current flows.

Figure 11:
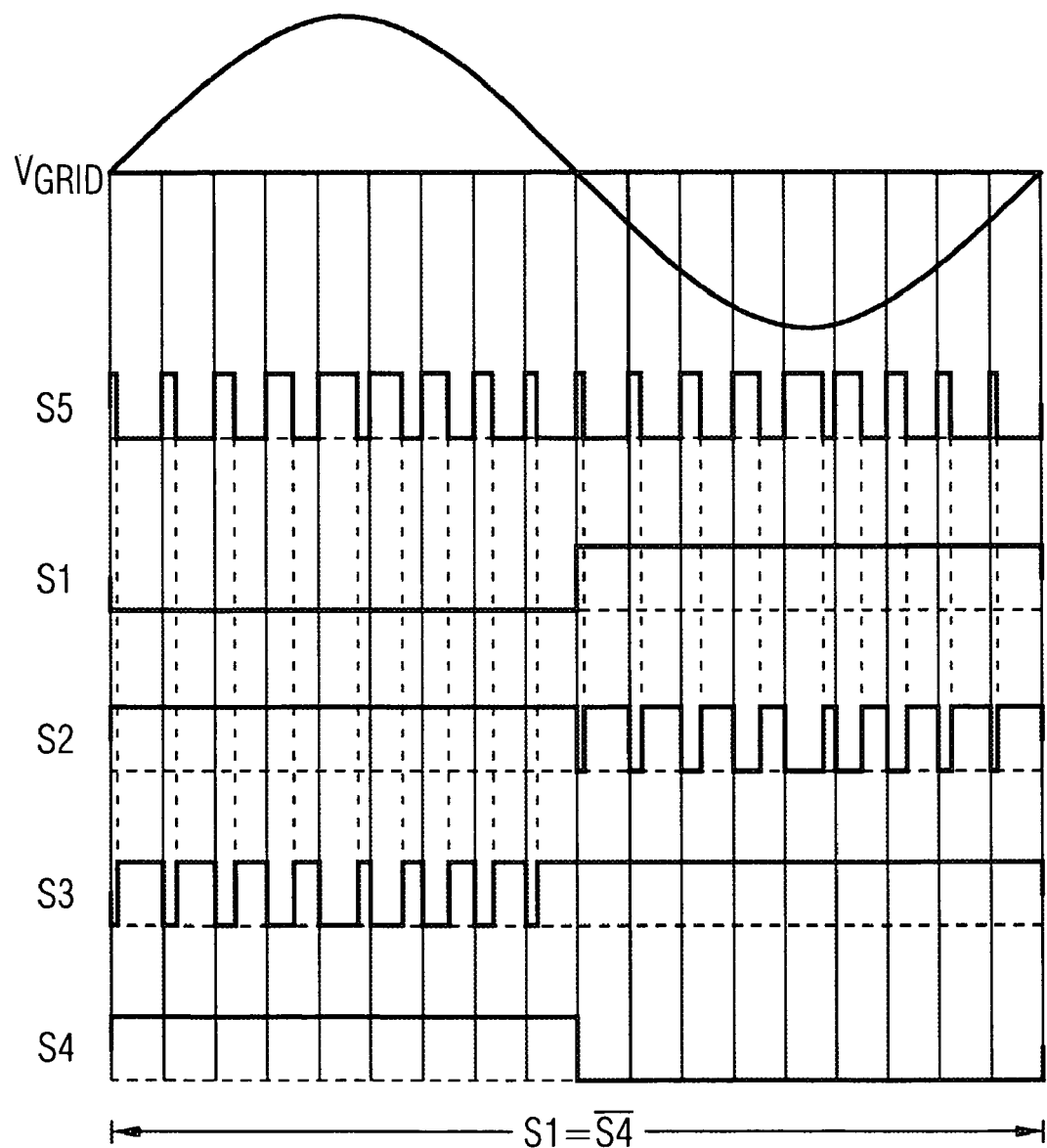
FIG. 11 shows Voltage and control signal waveforms for energy flow into the AC voltage grid

The waveforms for feeding into a public AC voltage grid connected on the secondary side are shown in FIG. 11. As also shown in FIGS. 3 to 6, a closing signal is applied to the second and fourth switching elements S2 and S4 during a positive half-cycle of the grid voltage. The first switching element S1 remains open. During a negative half-cycle of the grid voltage, a closing signal is applied to the first and third switching elements S1 and S3 and the fourth switching element S4 remains open. Over the entire sinusoidal wave, a switching signal which is the inverse of the switching signal of the fourth switching element S4 is therefore applied to the first switching element S1.

During the positive half-cycle, a switching cycle begins with the closing of the fifth switching element S5 and the opening of the third switching element S3. With increasing grid voltage, the ON-times of the fifth switching element S5 become longer in relation to the OFF-times according to a pulse width modulation, the switching signal for the third switching element S3 being the inverse of the signal for the fifth switching element.

During the negative half-cycle, the fifth switching element S5 switches in the same way, but with the second switching element S2 instead of the third switching element S3 switching inversely thereto.

Figure 12:
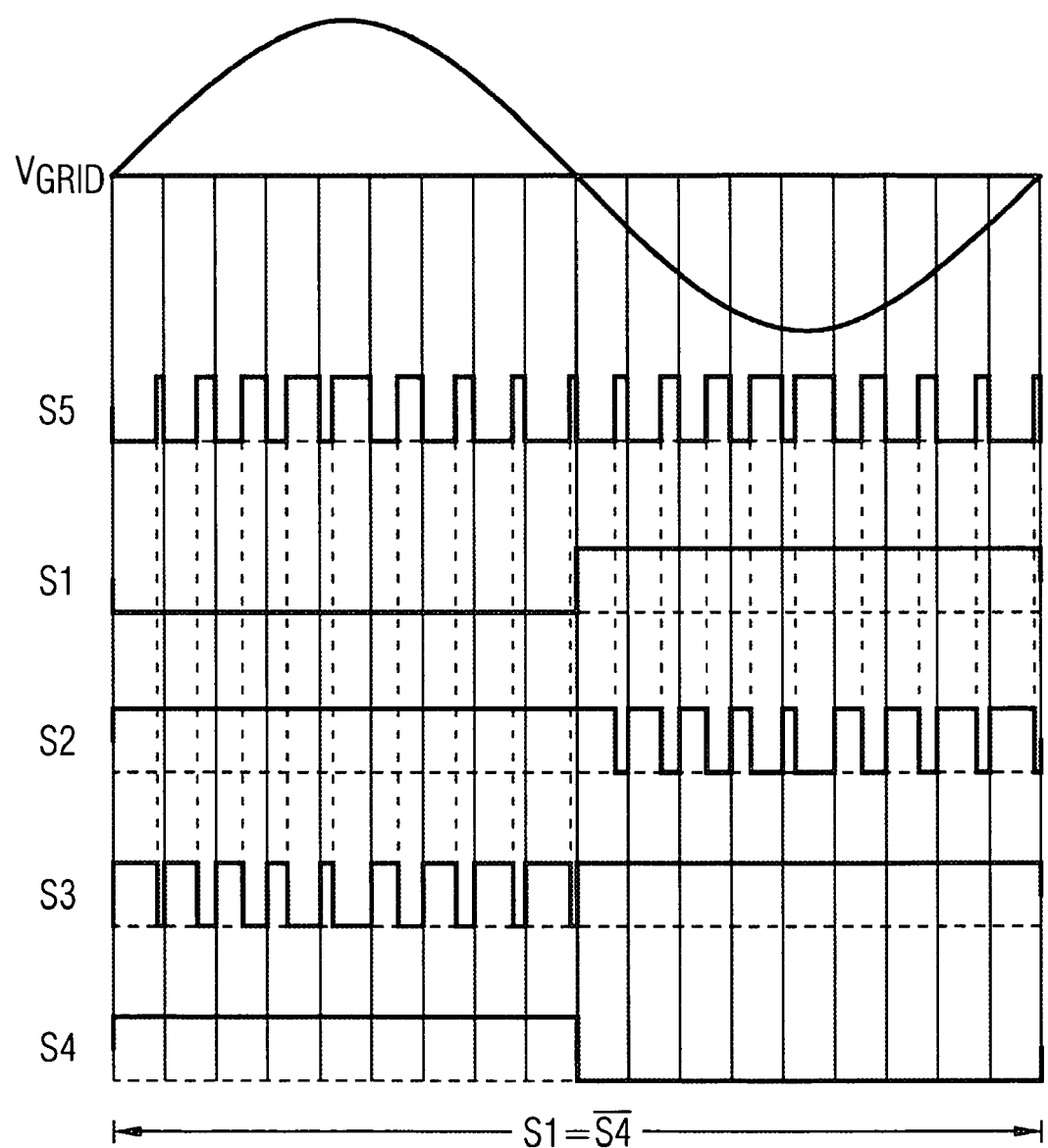
FIG. 12 shows voltage and control signal waveforms for backfeeding from the AC voltage grid

FIG. 12 shows the waveforms for backfeeding from a public AC voltage grid. As before, mutually inverse switching signals are applied to the first and fourth switching elements S1 and S4 during the entire sinusoidal wave, the first switching element S1 being open during a positive voltage half-cycle and the fourth switching element S4 being closed like the second switching element S2. The third switching element S3 switches inversely to the fifth switching element S5, a switching cycle beginning with the closing of the third switching element S3. With increasing grid voltage, the ON-time of the third switching element S3 become shorter in relation to the OFF-time according to a pulse width modulation. The ON-time of the fifth switching element S5 is consequently at its longest at maximum grid voltage.

During a negative grid voltage half-cycle, the fifth switching element S5 switches in the same way as during the positive grid voltage half-cycle. As in the case of feeding into the grid, the second switching element S2 instead of the third switching element S3 switches inversely thereto. The reversal of energy transfer during backfeeding from the grid is consequently brought about by the reversed closing sequence of the switching elements S5 and S3 and/or S2 which switch inversely to one another during each switching cycle, the ratios of the ON-times to the OFF-times being different according to the voltage level.

If the inverter circuit is operated in an island grid, the grid current generally leads or lags the grid voltage, depending on the capacitive and inductive characteristics of the connected loads.

Figure 13:
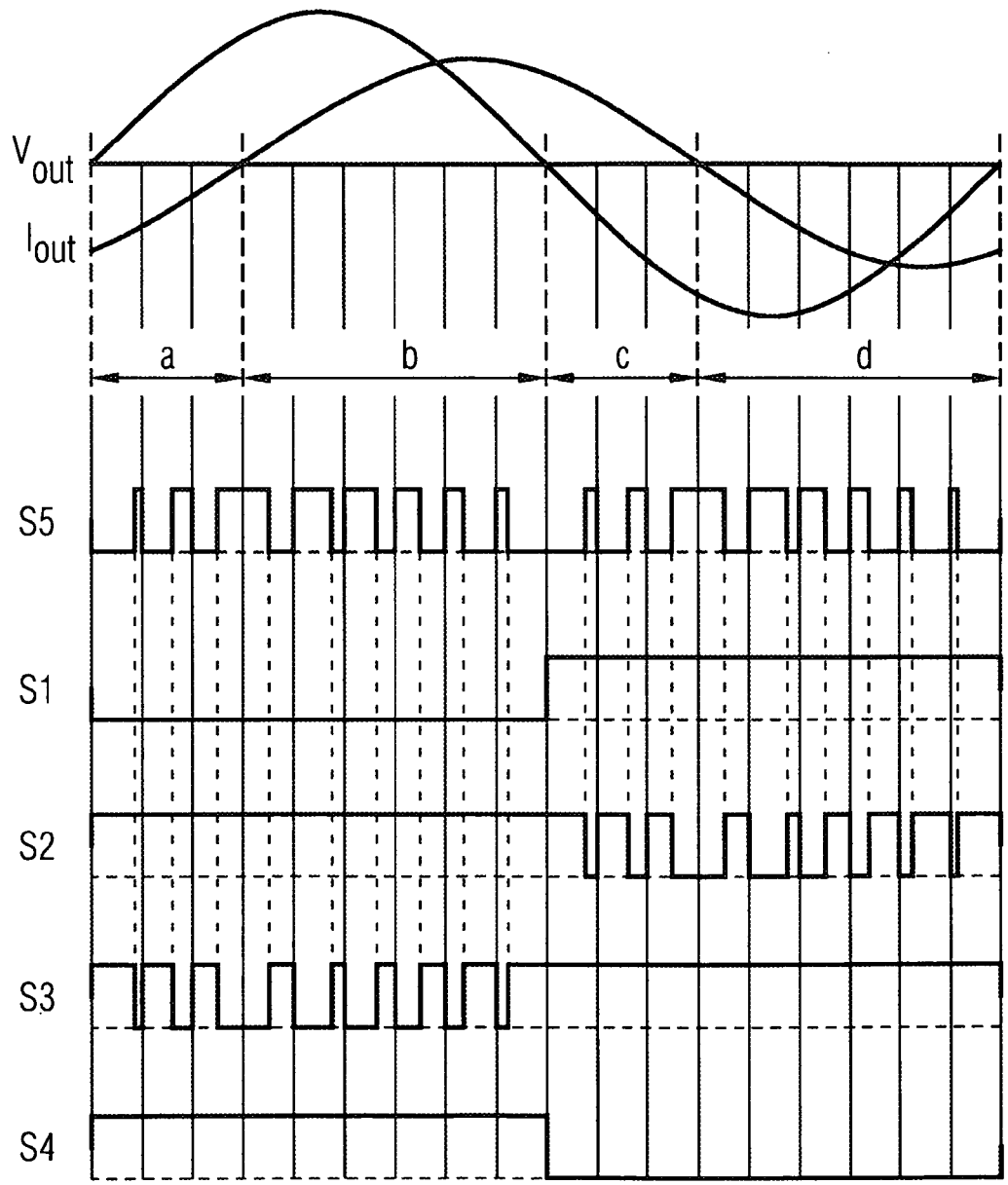
FIG. 13 shows grid voltage, grid current and control signal waveforms for reactive power absorption with inductive load during island operation

FIG. 13 shows the waveforms with an inductive load in island operation, with the grid current lagging the grid voltage. This results in a mixed mode between infeeding (sections b and d) to the grid and backfeeding (sections a and c) of reactive power from the grid. During a voltage half-cycle there are both positive and negative current waveforms. Accordingly, the switching cycles shown in FIG. 13 of the switching elements S5 and S3 and/or S2 are dependent on whether, for example, during a positive voltage half-cycle a positive grid current (infeeding, section b) or a negative grid current (backfeeding, section a) is flowing, the energy to be transferred resulting as the product of grid voltage and grid current and therefrom in turn the pulse width modulation of the control signals.

The switching states of the first switching element S1 and the fourth switching element S4 correspond to those shown in FIG. 11. During a positive half-cycle, the third switching element S3 and during a negative half-cycle the second switching element S2 switches inversely to the fifth switching element S5. If the signs of the grid current and grid voltage are the same (sections b and d), a switching cycle begins with closing of the fifth switching element S5 (infeeding). However, if the signs are different, a switching cycle begins with the closing of the third switching element S3 during a positive voltage half-cycle (section a) and the closing of the second switching element S2 during a negative voltage half-cycle (section c).

Figure 14:
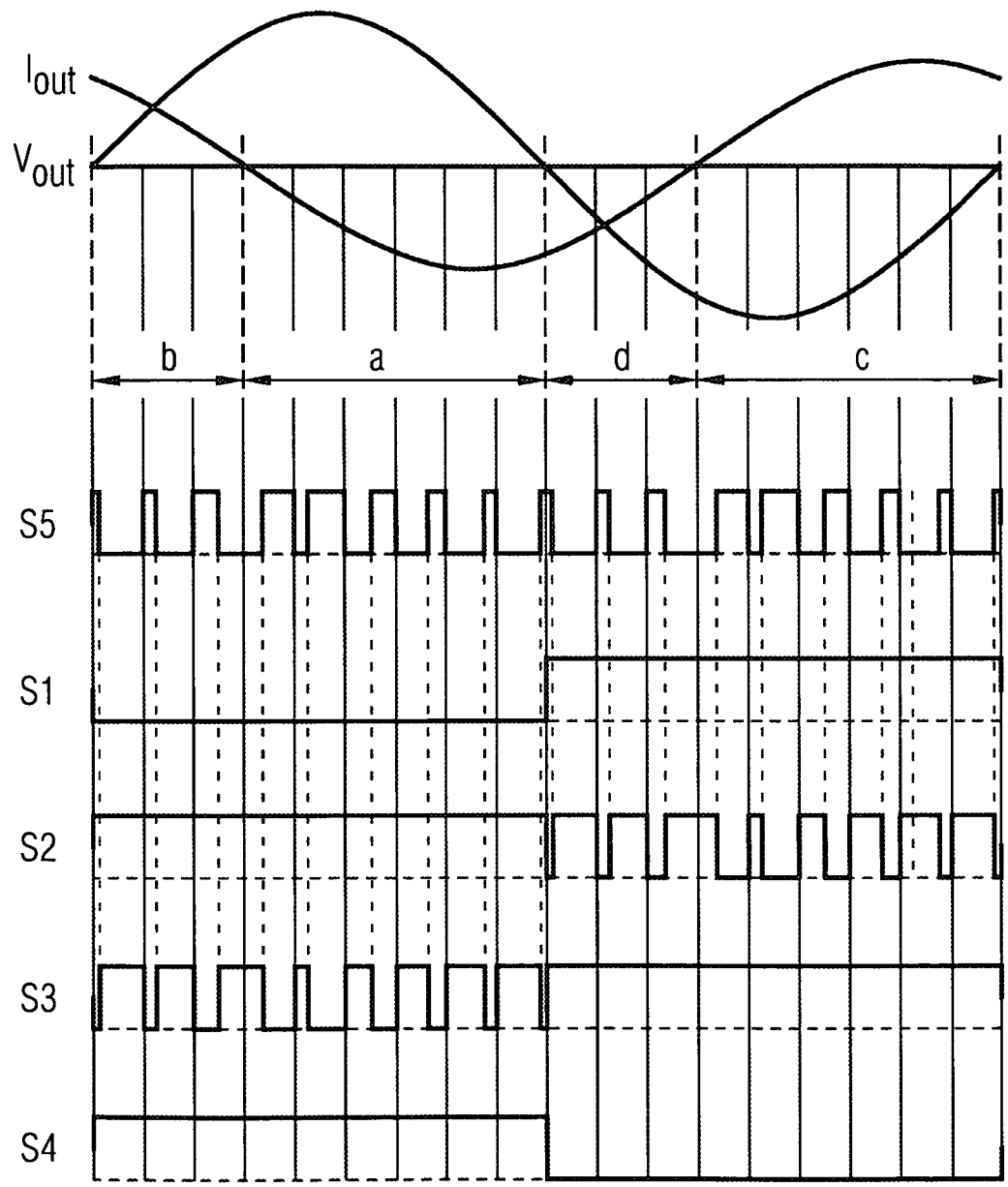
FIG. 14 shows grid voltage, grid current and control signal waveforms for reactive power absorption with capacitive load during island operation

FIG. 14 shows the waveforms for island operation with capacitive load, with the grid current leading the grid voltage. The ratios of the ON-times to the OFF-times of the switching elements S5, S3 and/or S2 therefore differ from the switching signal waveforms shown in FIG. 13.

Figure 15:
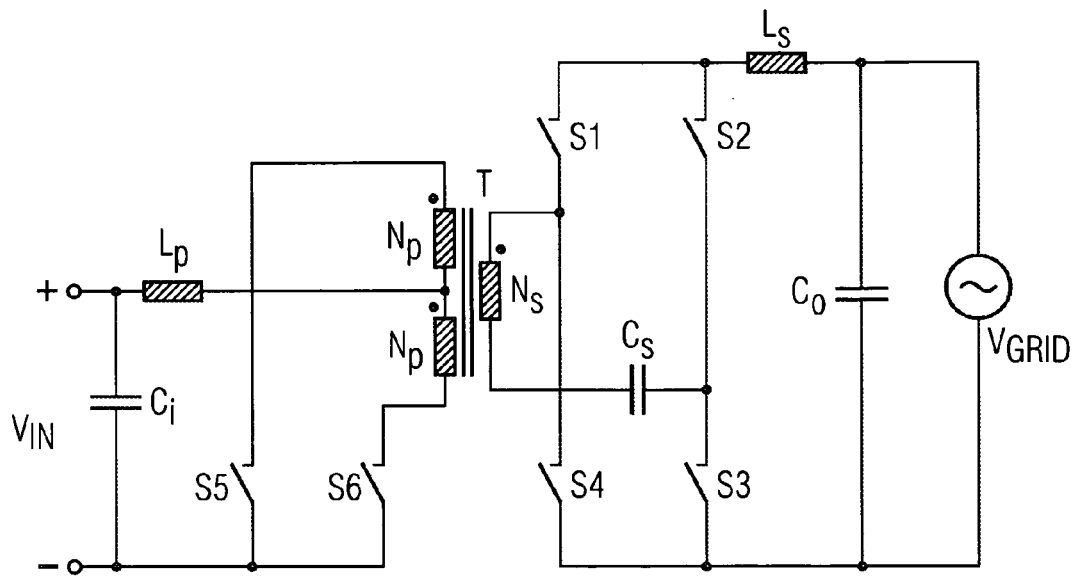
FIG. 15 shows an inverter circuit with electrically isolated push-pull primary stage and general switching elements

The subsequent FIGS. 15 to 35 show further examples of inverter circuits. FIG. 15 shows a circuit whose secondary side corresponds to that illustrated in FIG. 1. On the primary side, the primary stage of a Cuk converter is replaced by the primary stage of a push-pull converter. This obviates the need for a second capacitor and the primary winding $N_P$ is of split design, each part of the primary winding $N_P$ being connected to the DC voltage $V_{IN}$ by a separate switching element S5 and S6. The primary stage is again connected to the DC voltage $V_{IN}$ via a first choke $L_P$, thereby causing minimal ripple as in the case of the Cuk primary stage. For demagnetization of the transformer core it must be ensured that the ON-times of the two primary-side switching elements S5 and S6 are precisely synchronized.

Figure 16:
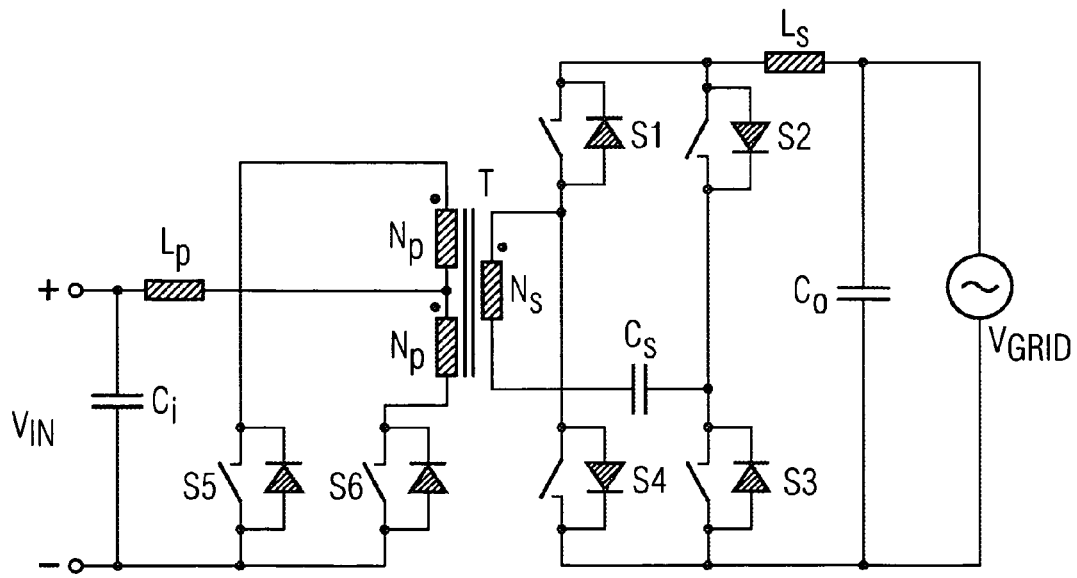
FIG. 16 shows an inverter circuit with electrically isolated push-pull primary stage and n-channel depletion-mode MOSFETs

FIG. 16 shows the circuit illustrated in FIG. 15 with the switching elements implemented as n-channel depletion-mode MOSFETs, the arrangement of the source and drain terminals corresponding of the secondary side to that shown in FIG. 2. On the primary side, the source terminals of the two switching elements S5 and S6 are connected to the negative pole of the DC voltage $V_{IN}$.

Figure 17:
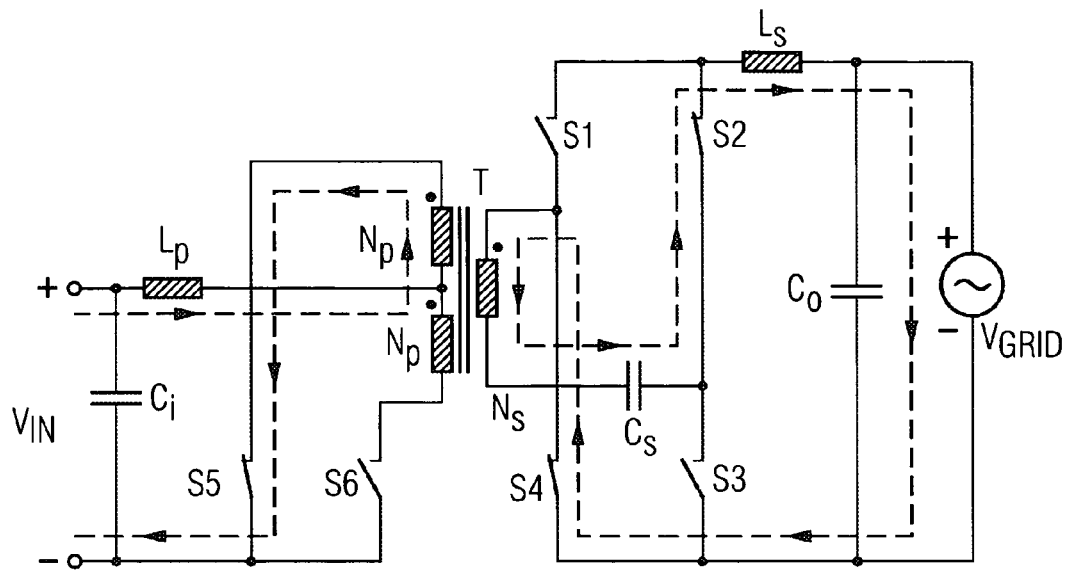
FIG. 17 shows an inverter circuit according to FIG. 15 with current flow during an ON-phase in the case of a positive half-cycle
Figure 18:
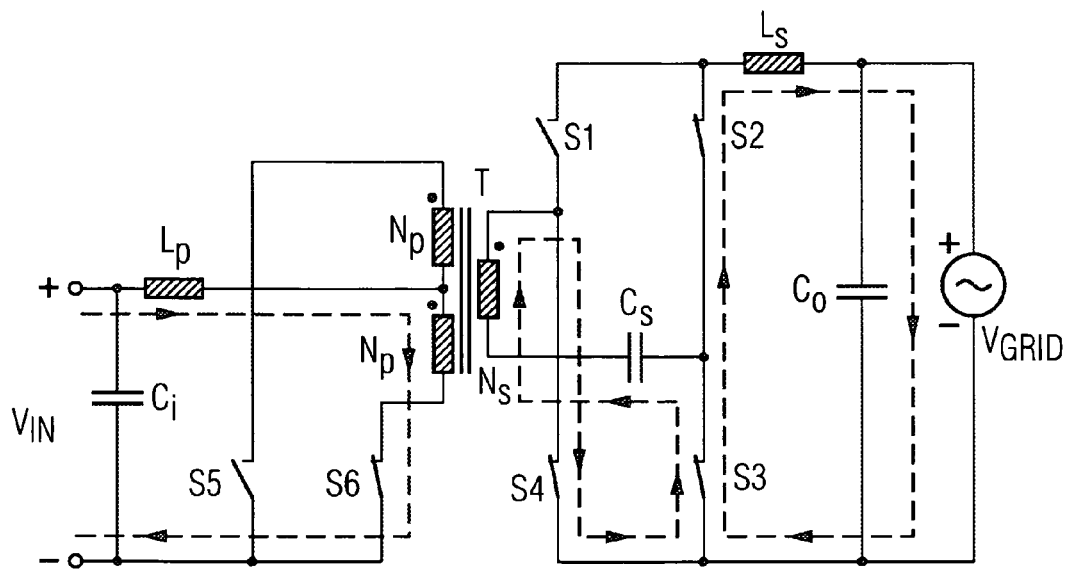
FIG. 18 shows an inverter circuit according to FIG. 15 with current flow during an OFF-phase in the case of a positive half-cycle

FIGS. 17 and 18 show the ON-phase and OFF-phase during a positive grid voltage half-cycle for feeding into an AC power grid, the switching states of the secondary-side switching elements S1, S2, S3 and S4 corresponding to those in FIGS. 3 and 4. The ON-phase begins with the closing of the fifth switching element S5 in the primary stage (FIG. 17). Current flows from the positive pole of the DC voltage $V_{IN}$ via the first choke $L_P$ and from the end to the start of the first section of the primary winding $N_P$ via the fifth switching element S5 to the negative pole of the DC voltage $V_{IN}$. Energy is transferred via the transformer T to the secondary side and fed into the connected power grid.

The OFF-phase (FIG. 18) begins with the fifth switching element S5 opening and the sixth switching element S6 and the third switching element S3 closing. The primary-side current therefore continues to flow through the first choke $L_P$ and from the start to the end of the second section of the primary winding $N_P$ via the sixth switching element S6 to the negative pole of the DC voltage $V_{IN}$.

Figure 19:
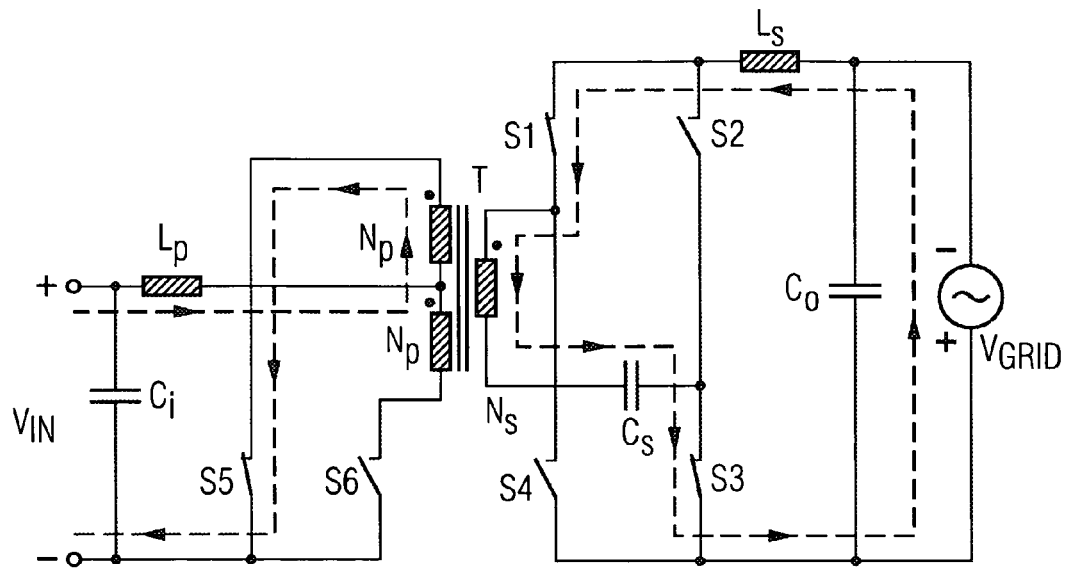
FIG. 19 shows an inverter circuit according to FIG. 15 with current flow during an ON-phase in the case of a negative half-cycle
Figure 20:
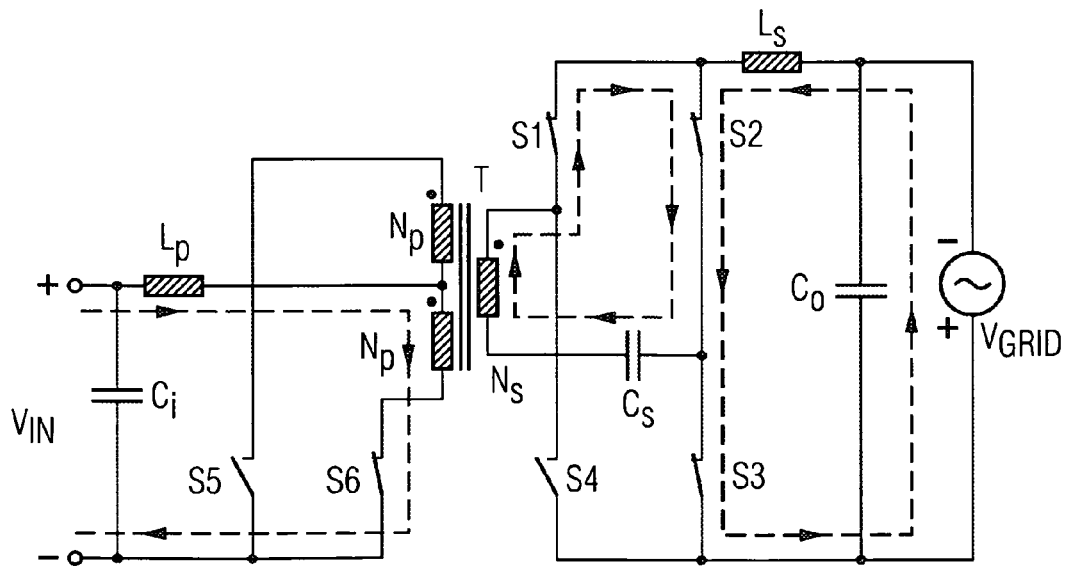
FIG. 20 shows an inverter circuit according to FIG. 15 with current flow during an OFF-phase in the case of a negative half-cycle

FIGS. 19 and 20 show the ON-phase and the OFF-phase for feeding into an AC voltage grid during a negative grid voltage half-cycle. The switching states of the switching elements S1, S2, S3 and S4 and the current flows on the secondary side correspond to those shown in FIGS. 5 and 6. The ON-phase (FIG. 19) begins with the closing of the fifth switching element S5 and the opening of the sixth and second switching elements S6 and S2. On the primary side, the current flow therefore corresponds to that shown in FIG. 17. The turn-off process (FIG. 20) again begins with the switchover of the primary-side switching elements S5 and S6 and the closing of the second switching element S2.

Figure 21:
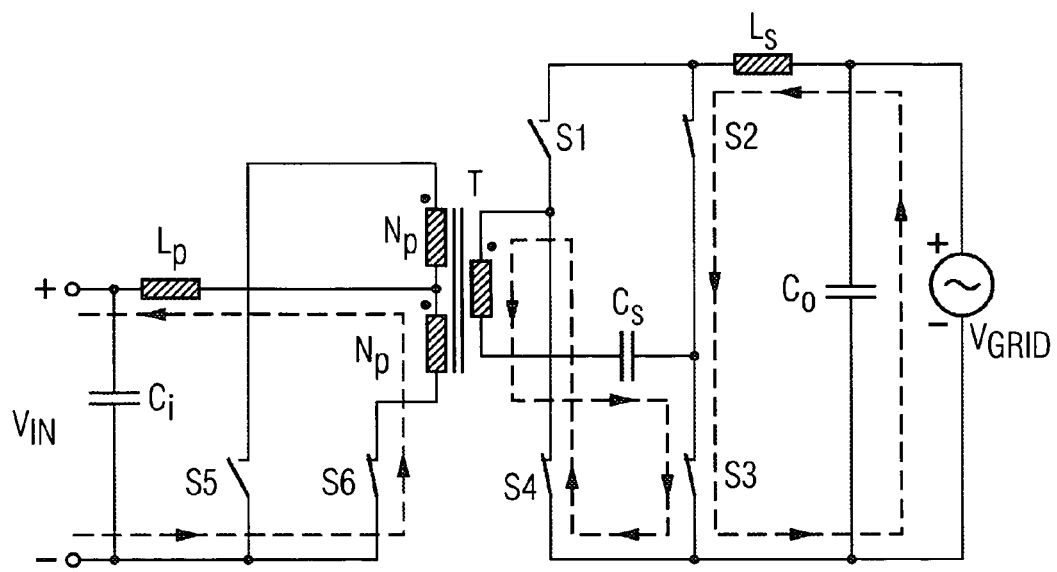
FIG. 21 shows an inverter circuit according to FIG. 15 with backfeeding current flow during an ON-phase in the case of a positive half-cycle
Figure 22:
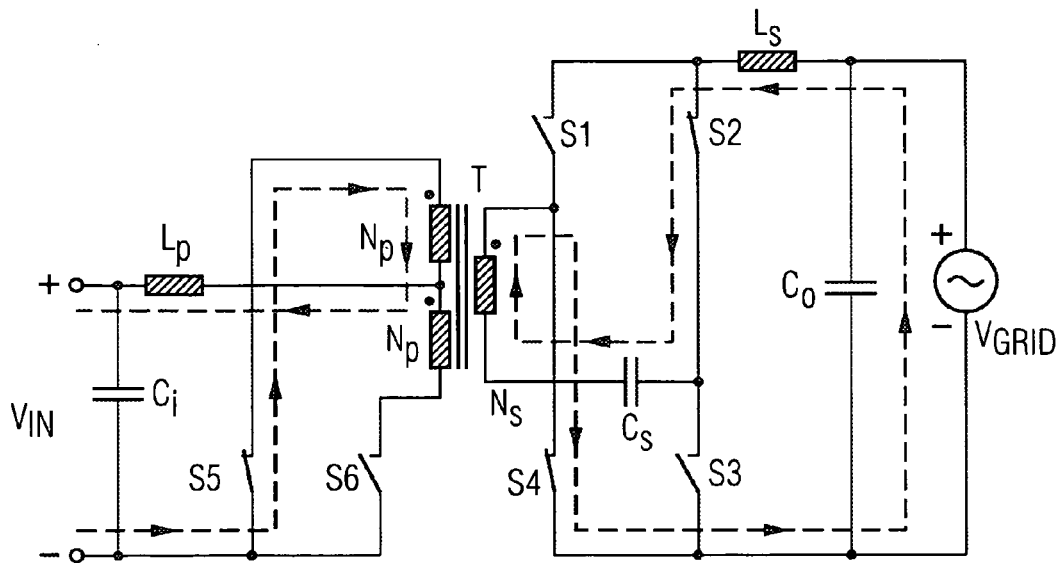
FIG. 22 shows an inverter circuit according to FIG. 15 with backfeeding current flow during an OFF-phase in the case of a positive half-cycle

FIGS. 21 and 22 show the ON-phase and the OFF-phase for backfeeding from an AC voltage grid to the actual primary side during a positive voltage half-cycle. The switching processes and current flows are identical to those shown in FIGS. 7 and 8. The ON-phase begins with the closing of the third switching element S3 and the switchover from the fifth to the sixth switching element S6. On the primary side, current is induced in the second section of the primary winding $N_P$ and flows through the first choke $L_P$ to the positive pole of the DC voltage $V_{IN}$, the circuit being completed via the closed sixth switching element S6.

At the start of the OFF-phase (FIG. 22) the third switching element S3 opens and, on the primary side, switchover from the sixth to the fifth switching elements S5 takes place. Current therefore flows on through the first choke $L_P$ to the positive pole of the DC voltage and the transformer T is demagnetized.

Figure 23:
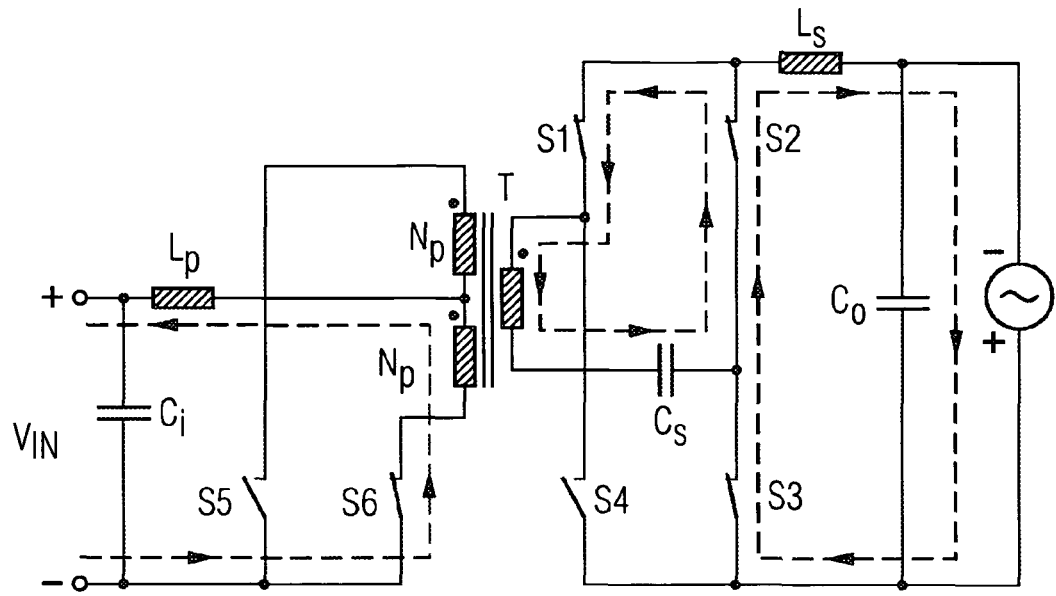
FIG. 23 shows an inverter circuit according to FIG. 15 with backfeeding current flow during an ON-phase in the case of a negative half-cycle
Figure 24:
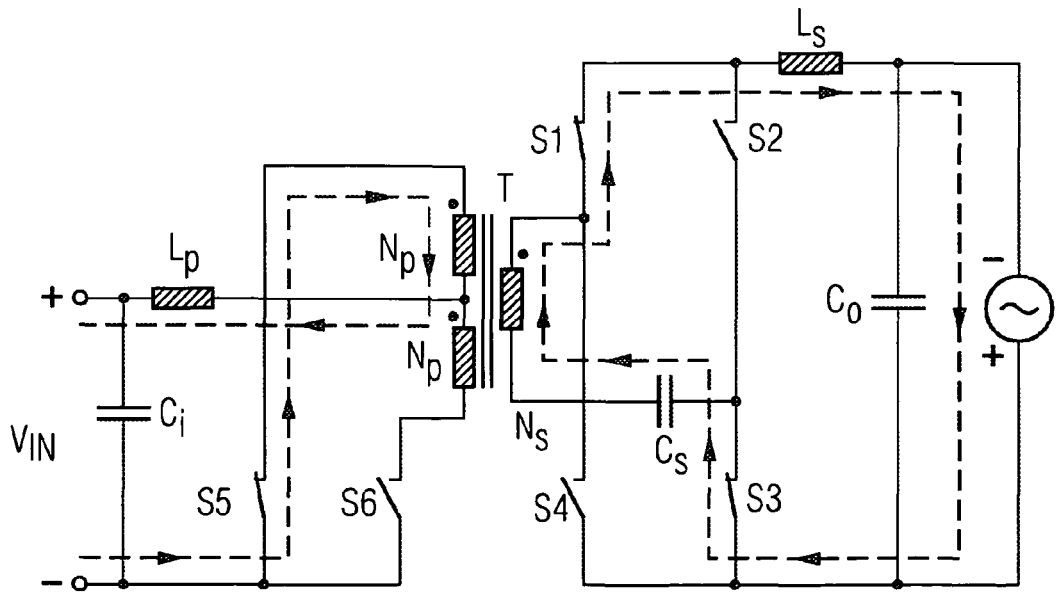
FIG. 24 shows an inverter circuit according to FIG. 15 with backfeeding current flow during an OFF-phase in the case of a negative half-cycle

FIGS. 23 and 24 show the ON-phase and the OFF-phase for backfeeding from an AC power grid to the actual primary side during a negative voltage half-cycle, the switching states and the current flows on the primary side corresponding to those shown in FIGS. 21 and 22. The secondary-side switching states are identical to those in FIGS. 9 and 10.

Figure 25:
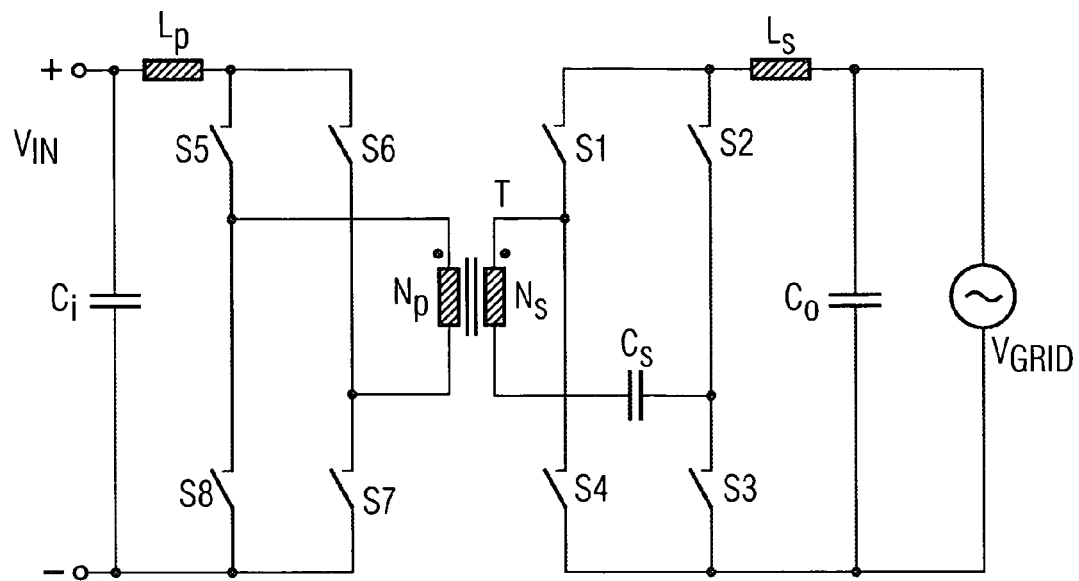
FIG. 25 shows an inverter circuit with electrically isolated full-bridge primary stage and general switching elements
Figure 26:
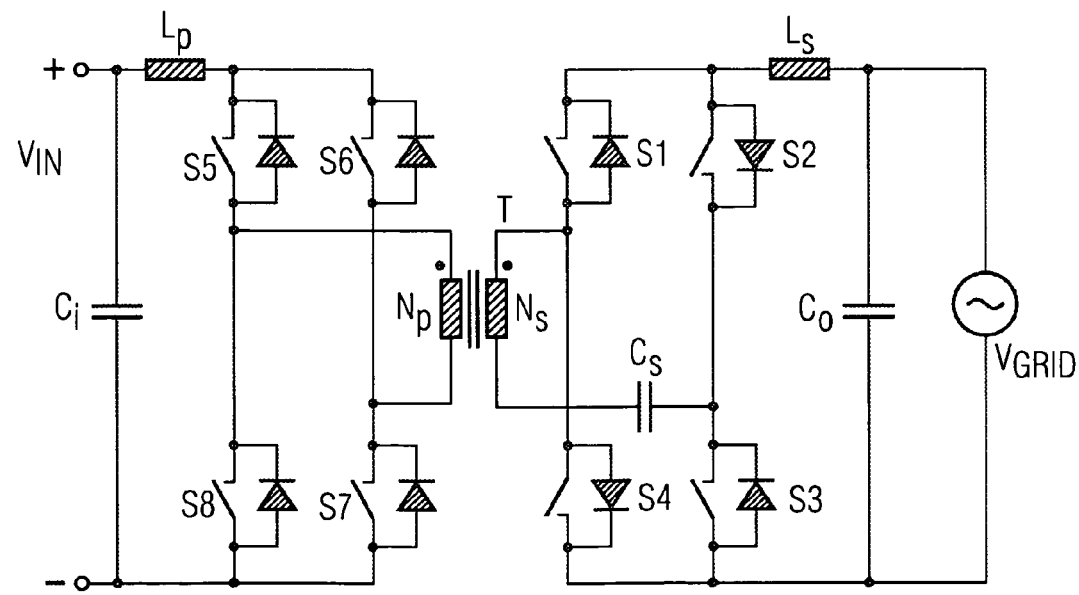
FIG. 26 shows an inverter circuit with electrically isolated full-bridge primary stage and n-channel depletion-mode MOSFETs
Figure 27:
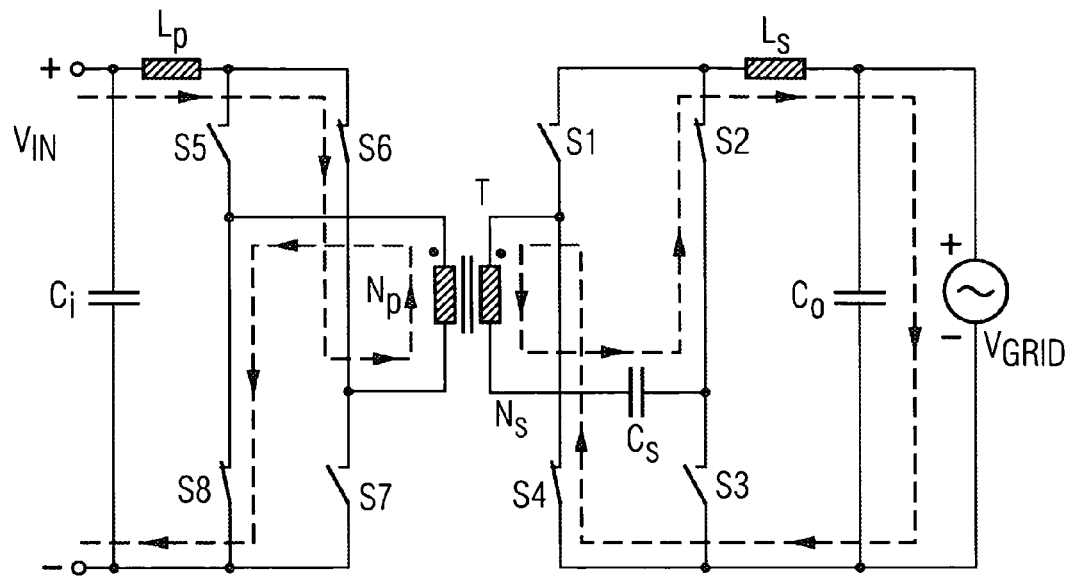
FIG. 27 shows an inverter circuit according to FIG. 25 with current flow during an ON-phase in the case of a positive half-cycle
Figure 28:
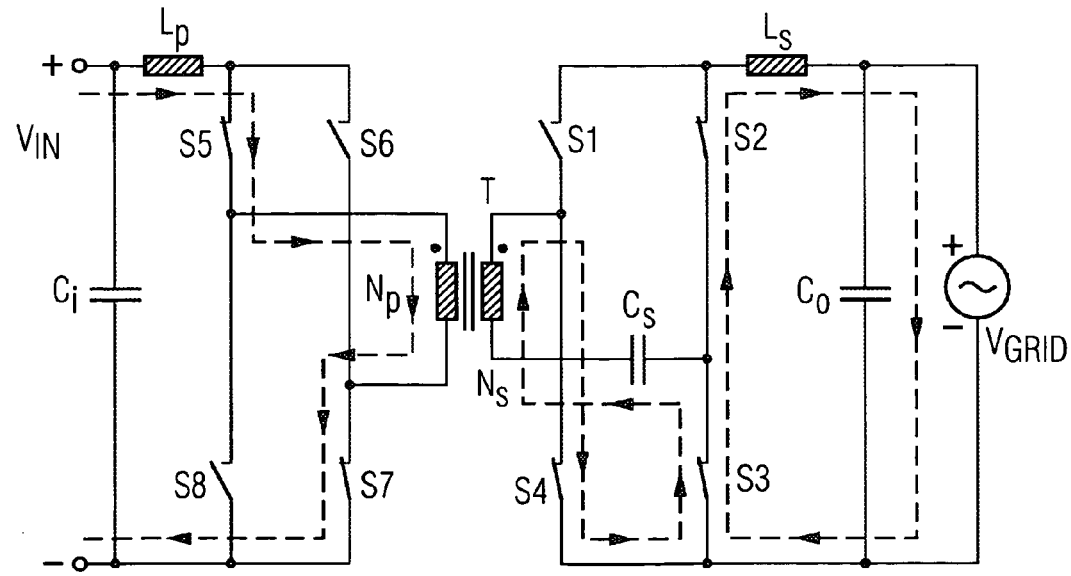
FIG. 28 shows an inverter circuit according to FIG. 25 with current flow during an OFF-phase in the case of a positive half-cycle
Figure 29:
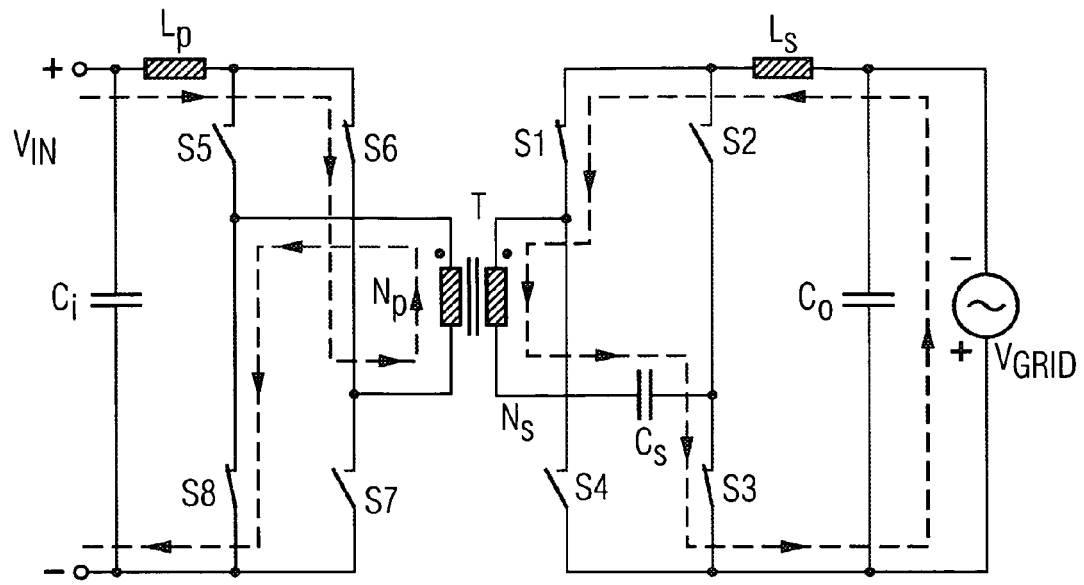
FIG. 29 shows an inverter circuit according to FIG. 25 with current flow during an ON-phase in the case of a negative half-cycle
Figure 30:
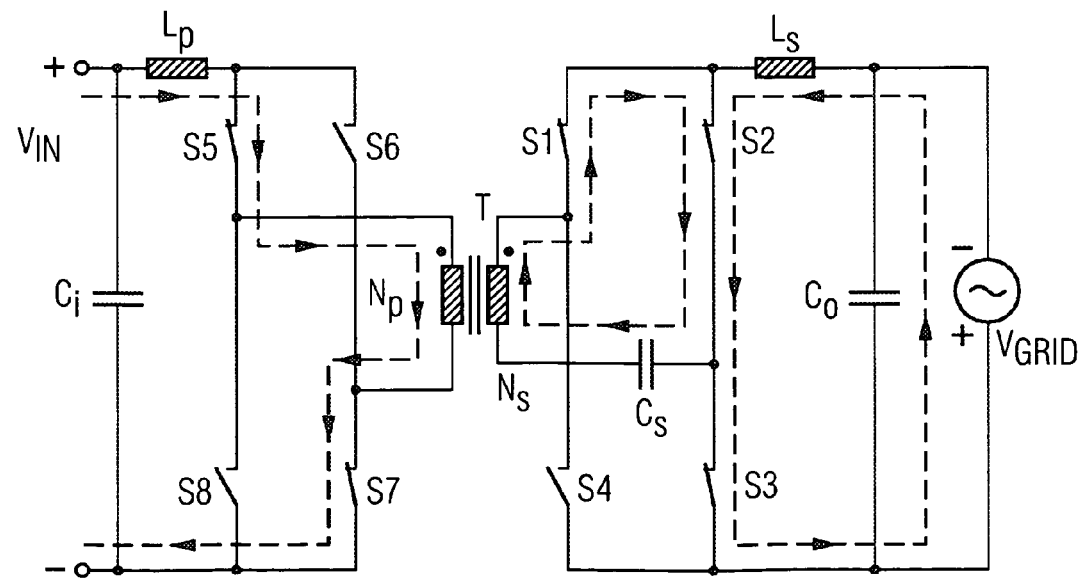
FIG. 30 shows an inverter circuit according to FIG. 25 with current flow during an OFF-phase in the case of a negative half-cycle
Figure 31:
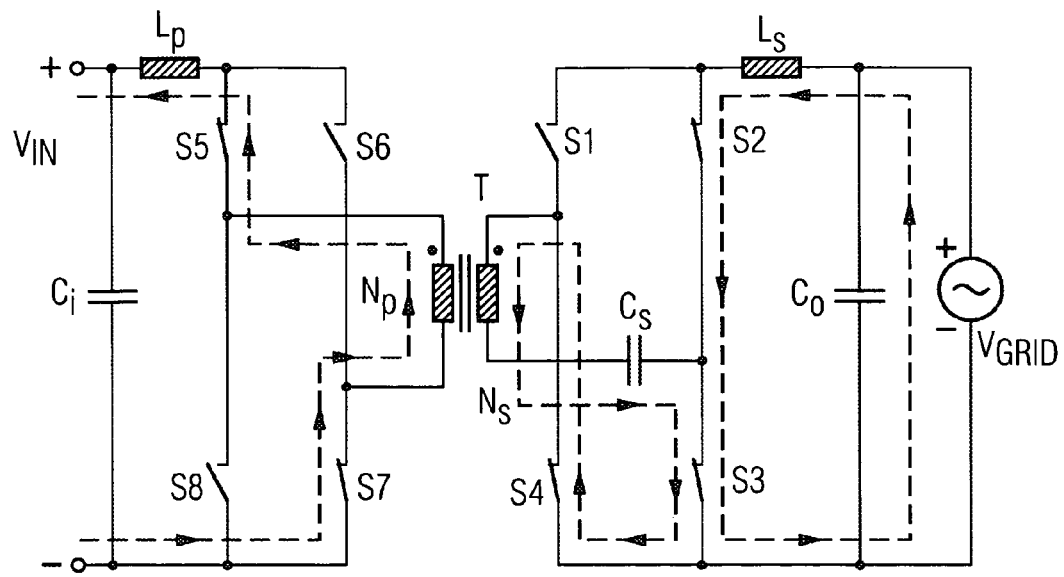
FIG. 31 shows an inverter circuit according to FIG. 25 with backfeeding current flow during an ON-phase in the case of a positive half-cycle
Figure 32:
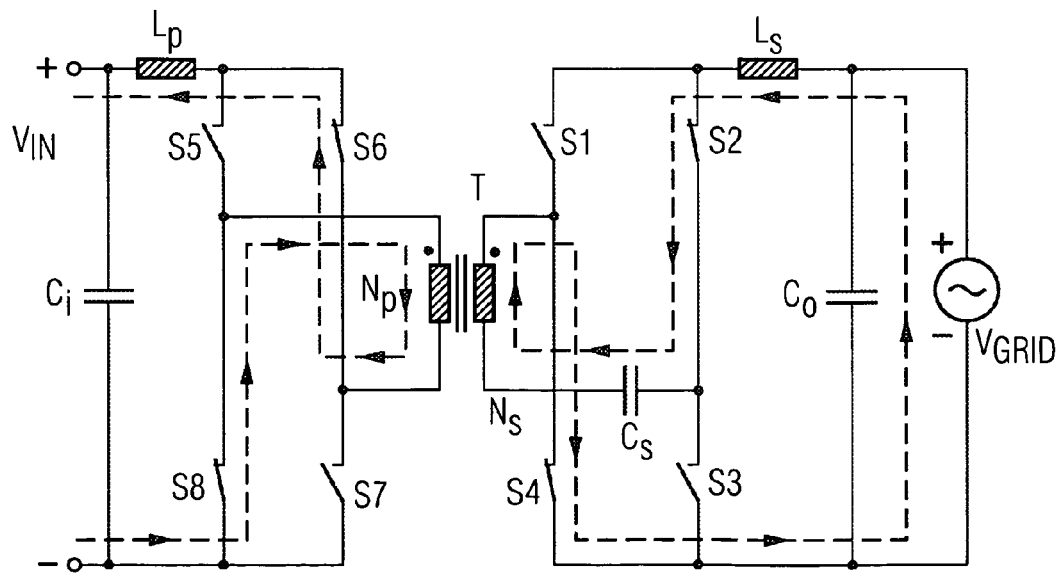
FIG. 32 shows an inverter circuit according to FIG. 25 with backfeeding current flow during an OFF-phase in the case of a positive half-cycle
Figure 33:
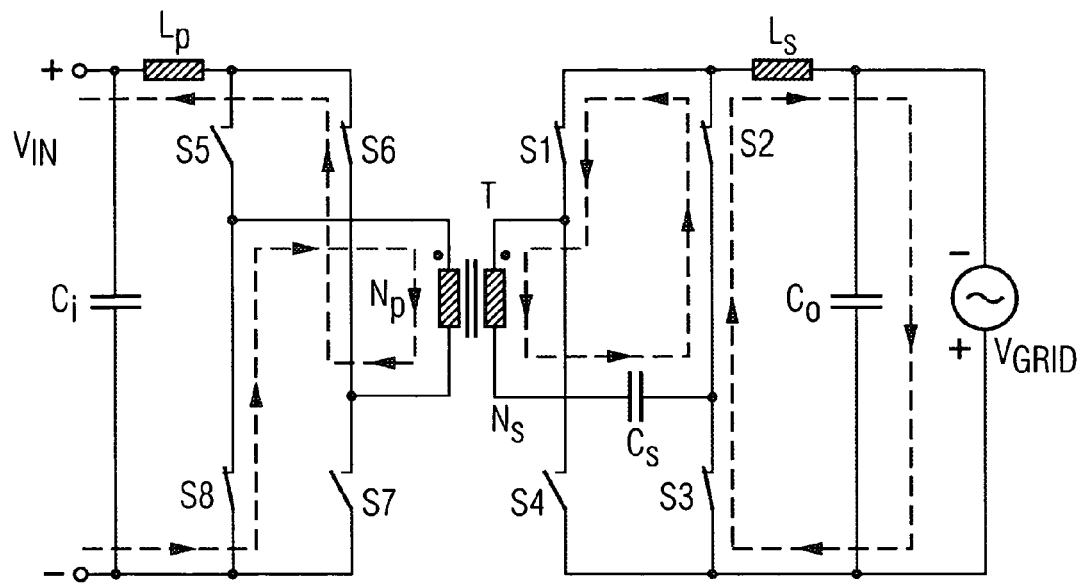
FIG. 33 shows an inverter circuit according to FIG. 25 with backfeeding current flow during an ON-phase in the case of a negative half-cycle
Figure 34:
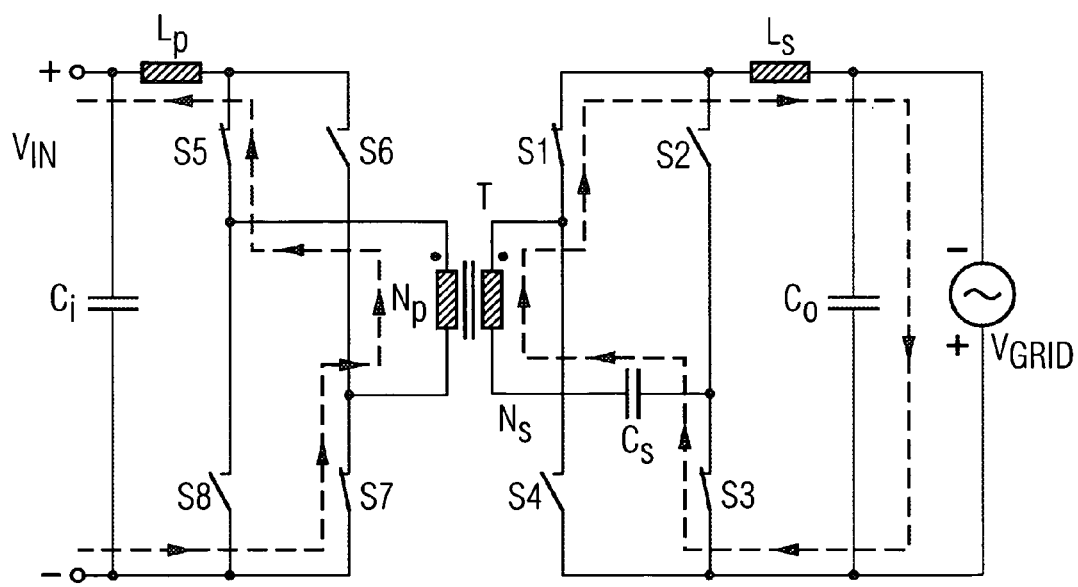
FIG. 34 shows an inverter circuit according to FIG. 25 with backfeeding current flow during an OFF-phase in the case of a negative half-cycle

FIG. 25 shows an exemplary inverter circuit with the secondary side unchanged. A full-bridge stage is disposed on the primary side. FIG. 26 shows the switching elements implemented as n-channel depletion-mode MOSFETs, the source terminals being connected to the negative pole and the drain terminals to the positive pole of the DC voltage $V_{IN}$ on the primary side. The connection to the DC voltage $V_{IN}$ is again via the first choke $L_P$ in order to protect the circuit from voltage spikes and minimize ripple.

FIGS. 27 to 34 show this inverter circuit according to FIG. 25 with different switching states and current flows for infeeding during a positive and a negative half-cycle and for backfeeding during a positive and a negative half-cycle, the switching states and current flows on the secondary side corresponding to those in FIGS. 3 to 10 and 17 to 24 respectively.

On the primary side there is disposed a primary winding $N_P$, the current flow directions through said primary winding $N_P$, as shown in FIGS. 27 to 34, corresponding to those shown in FIGS. 3 to 10. The switching elements S5, S6, S7 and S8 of the primary-side full bridge are connected in a corresponding manner.

Figure 35:
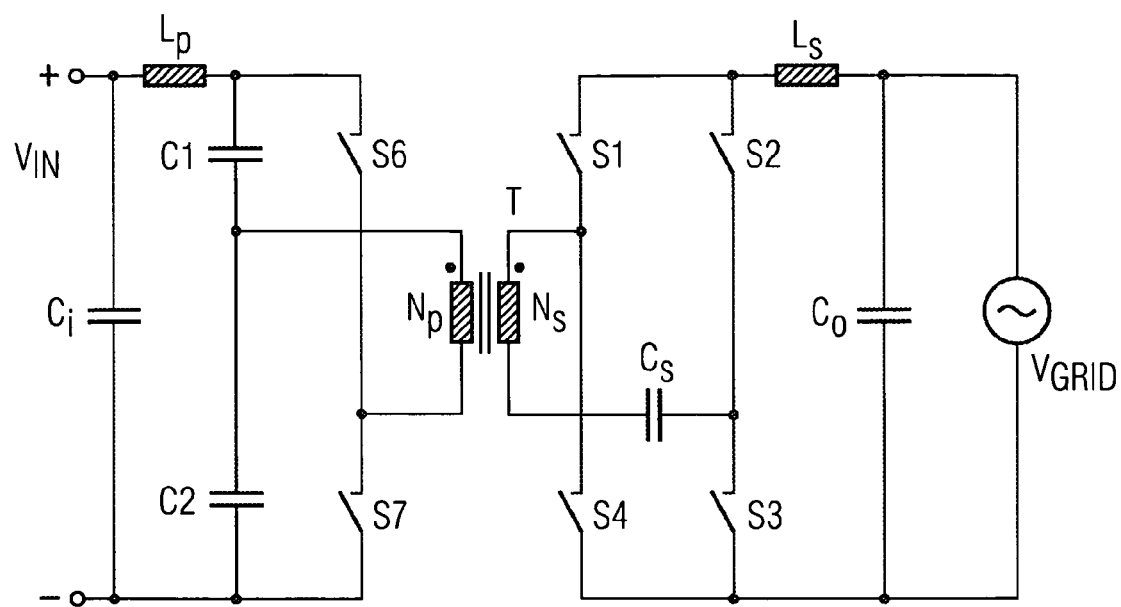
FIG. 35 shows an inverter circuit with electrically isolated half-bridge primary stage and general switching elements.

FIG. 35 shows an inverter circuit with a primary-side half bridge instead of the full bridge shown in FIG. 25, the fifth and eighth switching elements S5 and S8 of the full bridge being replaced by two capacitors C1 and C2. The desired direction of current flow through the primary winding $N_P$ is brought about by the switchover of the two switching elements S6 and S7, no pause during the switching process being necessary because of the first choke $L_P$ connected at the positive pole of the DC voltage.

The invention claimed is:

1. An inverter circuit, comprising:
 a primary circuit having a first choke for periodically connecting a primary winding to a DC voltage present at an input of the inverter circuit;
 a secondary circuit having a secondary winding, the secondary winding arranged in series with a first capacitor and connected via a full bridge consisting of four switching elements to a AC voltage present at an output of the inverter circuit via a second choke; and
 a transformer, wherein the primary circuit and the secondary circuit are electrically isolated by the transformer.

2. The inverter circuit as claimed in claim 1, wherein the full bridge is arranged such that a first termination of the secondary winding is connected via a first switching element to a first terminal of the second choke and via a fourth switching element to a reference potential of the AC voltage.

3. The inverter circuit as claimed in claim 1, wherein the full bridge is arranged such that a second termination of the secondary winding is connected in series with the first capacitor via a second switching element to the first terminal of the second choke and via a third switching element to the reference potential of the AC voltage.

4. The inverter circuit as claimed in claim 2, wherein the full bridge is arranged such that a second termination of the secondary winding is connected in series with the first capacitor via a second switching element to the first terminal of the second choke and via a third switching element to the reference potential of the AC voltage.

5. The inverter circuit as claimed in claim 1, wherein the primary circuit comprises a fifth switching element and a second capacitor, wherein the fifth switching element, the second capacitor and the first choke form the primary stage of a Cuk converter.

6. The inverter circuit as claimed in claim 4, wherein the primary circuit comprises a fifth switching element and a second capacitor, wherein the fifth switching element, the second capacitor and the first choke form the primary stage of a Cuk converter.

7. The inverter circuit as claimed in claim 1, wherein the primary circuit comprises a split primary winding as well as a fifth and a sixth switching element which, in conjunction with the first choke, form the primary stage of a push-pull converter.

8. The inverter circuit as claimed in claim 4, wherein the primary circuit comprises a split primary winding as well as a fifth and a sixth switching element which, in conjunction with the first choke, form the primary stage of a push-pull converter.

9. The inverter circuit as claimed in claim 1, wherein the primary winding, the secondary winding and the winding of the first choke are disposed on a transformer core.

10. The inverter circuit as claimed in claim 1, wherein the switching elements are implemented as n-channel insulated-gate field effect transistors.

11. The inverter circuit as claimed in claim 1, wherein the switching elements are implemented as insulated gate bipolar transistors with parallel diodes.

12. The inverter circuit as claimed in claim 1, further comprising:
 a control unit for controlling the switching elements, wherein the control unit is connected via measuring arrangements to the DC voltage and to the AC voltage and linked to the switching elements.

13. A method for operating an inverter circuit, wherein the inverter circuit has a primary circuit with a first choke for periodically connecting a primary winding to a DC voltage present at an input of the inverter circuit, a secondary circuit with a secondary winding, the secondary winding arranged in series with a first capacitor and connected via a full bridge consisting of four switching elements to a AC voltage present at an output of the inverter circuit via a second choke, and a transformer, wherein the primary circuit and the secondary circuit are electrically isolated by the transformer, comprising:
 opening a first switching element during a positive AC voltage half-cycle;
 closing a second and a fourth switching element; and
 switching a third switching element inversely to a switching mode of a primary circuit.

14. A method for operating an inverter circuit, wherein the inverter circuit has a primary circuit with a first choke for periodically connecting a primary winding to a DC voltage present at an input of the inverter circuit, a secondary circuit with a secondary winding, the secondary winding arranged in series with a first capacitor and connected via a full bridge consisting of four switching elements to a AC voltage present at an output of the inverter circuit via a second choke, and a transformer, wherein the primary circuit and the secondary circuit are electrically isolated by the transformer, comprising:
 opening a fourth switching element during a negative AC voltage half-cycle;
 closing a first and a third switching element; and
 switching a second switching element inversely to the switching mode of the primary circuit.

15. The method for operating an inverter circuit as claimed in claim 13, further comprising:
 opening the fourth switching element during a negative AC voltage half-cycle;
 closing the first and the third switching element; and
 switching the second switching element inversely to the switching mode of the primary circuit.

16. A method for operating an inverter circuit as claimed in claim 14, further comprising:
 opening the first switching element during a positive AC voltage half-cycle;

closing the second and the fourth switching element; and switching the third switching element inversely to the switching mode of a primary circuit.

17. The method as claimed in claim 15, wherein the third switching element is switched in a pulse width modulated manner such that each charging cycle of the transformer begins with the closing of the third switching element in case of a positive AC voltage half-cycle and a negative output current.

18. The method as claimed in claim 16, wherein the second switching element is switched such that each charging cycle of the transformer begins with the closing of the second switching element in case of a negative AC voltage half-cycle and a positive output current.

19. The method as claimed in claim 17, wherein the second switching element is switched such that each charging cycle of the transformer begins with the closing of the second switching element in case of a negative AC voltage half-cycle and a positive output current.

20. The method as claimed in claim 18, wherein the third switching element is switched in a pulse width modulated manner such that each charging cycle of the transformer begins with the closing of the third switching element in case of a positive AC voltage half-cycle and a negative output current.

* * * * *